United States Patent
Deschamps

(10) Patent No.: US 9,283,992 B2
(45) Date of Patent: Mar. 15, 2016

(54) VEHICLE

(71) Applicant: YAMAHA MOTOR MANUFACTURING CORP. OF AMERICA, Newnan, GA (US)

(72) Inventor: Michael Deschamps, Newnan, GA (US)

(73) Assignee: YAMAHA MOTOR MANUFACTURING CORPORATION OF AMERICA, Newnan, GA (US)

( * ) Notice: Subject to any disclaimer, the term of this patent is extended or adjusted under 35 U.S.C. 154(b) by 0 days.

(21) Appl. No.: 14/312,928

(22) Filed: Jun. 24, 2014

(65) Prior Publication Data
US 2015/0367891 A1 Dec. 24, 2015

(51) Int. Cl.
 *B62D 21/18* (2006.01)
 *B62D 25/16* (2006.01)
 *B62D 31/00* (2006.01)

(52) U.S. Cl.
 CPC .............. *B62D 21/183* (2013.01); *B62D 25/16* (2013.01); *B62D 31/003* (2013.01)

(58) Field of Classification Search
 CPC ..... B62D 21/183; B62D 25/16; B62D 31/003
 See application file for complete search history.

(56) References Cited

U.S. PATENT DOCUMENTS

| | | | | | |
|---|---|---|---|---|---|
| 5,251,713 | A | * | 10/1993 | Enokimoto | 180/68.4 |
| 5,327,989 | A | * | 7/1994 | Furuhashi et al. | 180/248 |
| 5,401,056 | A | * | 3/1995 | Eastman | 280/785 |
| 6,478,103 | B1 | * | 11/2002 | Matsuura | 180/90.6 |
| 6,749,039 | B1 | * | 6/2004 | Uphaus | 180/357 |
| 7,287,619 | B2 | * | 10/2007 | Tanaka et al. | 180/291 |
| D579,029 | S | * | 10/2008 | Harsh | D15/33 |
| 8,613,337 | B2 | * | 12/2013 | Kinsman et al. | 180/68.3 |
| 2001/0013440 | A1 | * | 8/2001 | Izumi et al. | 180/247 |
| 2002/0125057 | A1 | * | 9/2002 | Kitai et al. | 180/233 |
| 2002/0139598 | A1 | * | 10/2002 | Miguchi | 180/244 |
| 2002/0167190 | A1 | * | 11/2002 | McElwee et al. | 296/77.1 |
| 2012/0031693 | A1 | | 2/2012 | Deckard et al. | |

* cited by examiner

*Primary Examiner* — Ruth Ilan
*Assistant Examiner* — Timothy Wilhelm
(74) *Attorney, Agent, or Firm* — Keating and Bennett, LLP

(57) ABSTRACT

A vehicle includes a left front wheel and a right front wheel, a left rear wheel and a right rear wheel, and a frame that rotatably supports the wheels. The frame includes a left frame portion and a right frame portion each extending in a front-back direction, a left protruded portion that protrudes to the left from the left frame portion, forward of the left rear wheel, and a right protruded portion that protrudes to the right from right frame portion, forward of the right rear wheel. In a front view, from outside to inside, the left rear wheel, the left protruded portion, and the left front wheel are arranged in this order. In the front view, from outside to inside, the right rear wheel, the right protruded portion, and the right front wheel are disposed in this order.

26 Claims, 16 Drawing Sheets

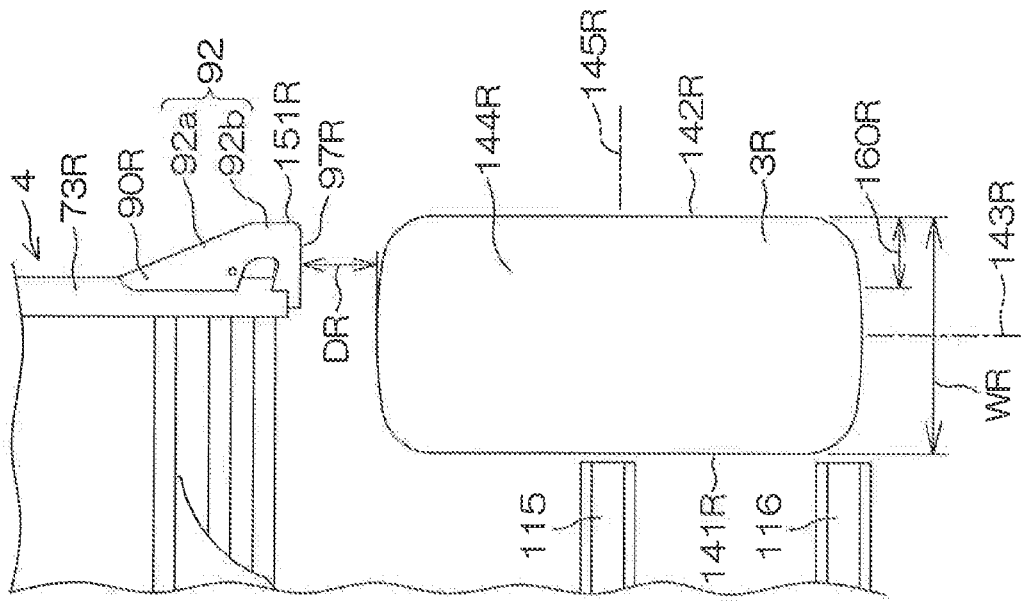
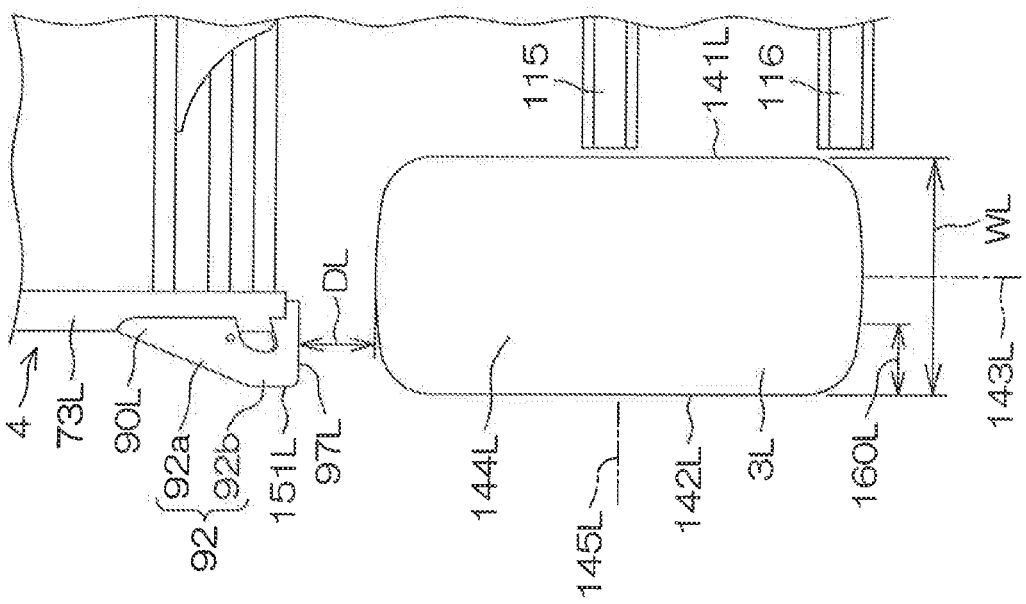

VEHICLE

BACKGROUND OF THE INVENTION

1. Field of the Invention

The present invention relates to a vehicle including a wheel and a frame supporting the same.

2. Description of the Related Art

US 2012/0031693 A1 discloses a side-by-side vehicle, which is within a category of a utility vehicle. The side-by-side vehicle includes a pair of left and right front wheels (104), a pair of left and right rear wheels (104), a frame (112) to which the four wheels are coupled, and a body panel (236) supported by the frame. The frame is positioned inside of an inner end of the pair of rear wheels. The body panel includes fender portions (552). Each of the fender portions covers a front side and an upper side of the corresponding rear wheel. The rear wheels are positioned outside of the fender portions, and the front wheels are positioned outside of the rear wheels. The body panel has a complicated shape, and is therefore generally manufactured from a resin material.

U.S. Pat. No. 5,251,713 discloses a four wheel vehicle in the form of an off road recreational vehicle. The vehicle includes a pair of front wheels (12), a pair of rear wheels (14), and a frame structure (10) supporting the wheels. The frame structure includes a pair of lower-side main frame tubes (18) and a pair of upper-side main frame tubes (16). The pair of lower-side main frame tubes are positioned inside of an inner end of the pair of rear wheels, and extend in a front-back direction. In the pair of upper-side main frame tubes, a distance between the pair of upper-side main frame tubes is the longest at an intermediate portion in the front-back direction, and a distance therebetween at a front end and a rear end is shorter than the above distance at the intermediate portion. As a result, the upper-side main frame tubes are inclined to expand outward toward the respective intermediate portions from the respective front ends, with respect to the front-back direction of a vehicle. The intermediate portions of the upper-side main frame tubes are positioned inside of the front wheels and the rear wheels.

SUMMARY OF THE INVENTION

The inventor of preferred embodiments of the present invention described and claimed in the present application conducted an extensive study and research regarding a vehicle, such as the one described above, and in doing so, discovered and first recognized new unique challenges and previously unrecognized possibilities for improvements as described in greater detail below.

In the vehicle in US 2012/0031693 A1, each of the fender portions covers the front side of the corresponding rear wheel. However, when the vehicle passes through a forest or a narrow place, an obstacle such as a tree may hit the fender portion or the rear wheel, and the fender portion or the rear wheels may be damaged.

In the main frame tubes at an upper side of the vehicle in U.S. Pat. No. 5,251,713, the intermediate portions expand outward. However, the intermediate portions do not sufficiently protrude outward of the vehicle, and besides, the distance to the rear wheels is long. Therefore, the intermediate portions do not protect the rear wheels.

A preferred embodiment of the present invention provides a vehicle including a left front wheel and a right front wheel arranged in a left-right direction of the vehicle, a left rear wheel and a right rear wheel arranged in the left-right direction of the vehicle and rearward of the left front wheel and the right front wheel, and a frame that rotatably supports the left front wheel, the right front wheel, the left rear wheel, and the right rear wheel. The frame includes a left frame portion and a right frame portion each extending in a front-back direction of the vehicle; a left protruded portion that is supported by the left frame portion, that protrudes to a left side with respect to the left frame portion, and that is arranged forward of the left rear wheel; and a right protruded portion that is supported by the right frame portion, that protrudes to a right side with respect to the right frame portion, and that is arranged forward of the right rear wheel. In a front view of the vehicle, from outside to inside, the left rear wheel, the left protruded portion, and the left front wheel are arranged in this order. Further, in the front view, from outside to inside, the right rear wheel, the right protruded portion, and the right front wheel are arranged in this order.

According to this arrangement, the left protruded portion is supported by the left frame portion extending in the front-back direction, and is arranged forward of the left rear wheel. The left protruded portion protrudes to a left side with respect to the left frame portion. Further, the right protruded portion is supported by the right frame portion extending in the front-back direction, and is arranged forward of the right rear wheel. The right protruded portion protrudes to a right side with respect to the right frame portion. The left protruded portion is positioned outside of the left front wheel, and the right protruded portion is positioned outside of the right front wheel.

The left protruded portion is positioned inside of the left rear wheel, and thus, the left frame portion is positioned inside of the left rear wheel. Similarly, the right protruded portion is positioned inside of the right rear wheel, and thus, the right frame portion is positioned inside of the right rear wheel. Therefore, a distance between the left frame portion and the right frame portion is shortened, and a compact vehicle body is achieved.

The left protruded portion is positioned forward of the left rear wheel and the right protruded portion is positioned forward of the right rear wheel, and thus, the left protruded portion and the right protruded portion are configured to hit an obstacle such as a tree or a rock before the rear wheels hit the obstacle to clear out the obstacle forward of the rear wheels. In this manner, a situation where the rear wheels are damaged by the obstacle is avoided. The left protruded portion and the right protruded portion are each positioned outside of the left front wheel and the right front wheel, which effectively clears out the obstacle.

In a preferred embodiment of the present invention, the left frame portion extends linearly in the front-back direction between the left front wheel and the left rear wheel, the left protruded portion protrudes in a direction to cross a longitudinal direction of the left frame portion, the right frame portion extends linearly in the front-back direction between the right front wheel and the right rear wheel, and the right protruded portion protrudes in a direction to cross a longitudinal direction of the right frame portion. In this arrangement, the left protruded portion and the right protruded portion each protrude outward from the linearly extending left frame portion and right frame portion. Thus, forward of the rear wheels, the obstacle is, by the linear frame portions and the protruded portion corresponding thereto, guided to outside of the vehicle to be cleared out. Therefore, it is possible to effectively clear out the obstacle and to more reliably protect the rear wheels.

In a preferred embodiment of the present invention, the left protruded portion and the right protruded portion each include a tapered portion tapered outward toward a rear.

According to this arrangement, the provision of the tapered portions of the left protruded portion and the right protruded portion guides the obstacle to outside of the vehicle and the obstacle is effectively cleared out from forward of the rear wheels. As a result, it is possible to more reliably protect the rear wheels.

In a preferred embodiment of the present invention, the left frame portion, the right frame portion, the left protruded portion, and the right protruded portion are preferably made from metal. According to this arrangement, the frame portions and the protruded portions are made from metal and it is thus possible to more reliably clear out the obstacle from forward of the rear wheels.

In a preferred embodiment of the present invention, the left protruded portion is preferably welded to the left frame portion, and the right protruded portion is preferably welded to the right frame portion. According to this arrangement, the coupling between the protruded portion and the frame portion has sufficient strength so that it is possible to more reliably clear out the obstacle from forward of the rear wheels.

In a preferred embodiment of the present invention, in the front view, the outermost end of the left protruded portion is positioned within a left end region having a width, for example, about 30% of the entire width, in the left-right direction, of the left rear wheel, and in the front view, the outermost end of the right protruded portion is positioned within a right end region having a width, for example, about 30% of an entire width, in the left-right direction, of the right rear wheel. According to this arrangement, in the front view, a region having a width, in the left-right direction covering, for example, about 70% or more from inside of the rear wheel is protected by the frame. As a result, it is possible to more reliably protect the rear wheels.

In a preferred embodiment of the present invention, the left protruded portion is arranged at a height within a width, in an up-down direction of the vehicle, of the left rear wheel, and the right protruded portion is arranged at a height within a width, in the up-down direction, of the right rear wheel. According to this arrangement, the protruded portion is disposed at a height within a width, in the up-down direction, of the corresponding rear wheel, and thus it is possible to more reliably protect the corresponding rear wheel by the protruded portion.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 15A is a partial plan view showing a positional relationship between the left rear wheel and the frame.
FIG. 15B is a partial plan view showing a positional relationship between the right rear wheel and the frame.

DETAILED DESCRIPTION OF THE PREFERRED EMBODIMENTS

In the description of preferred embodiments below, front-back, left-right, and up-down are directions defined with reference to a viewpoint of a driver seated on a seat unit of a vehicle while facing a steering wheel. Further, the description is made with reference to a state where the vehicle is on a horizontal surface.

Figure 1:
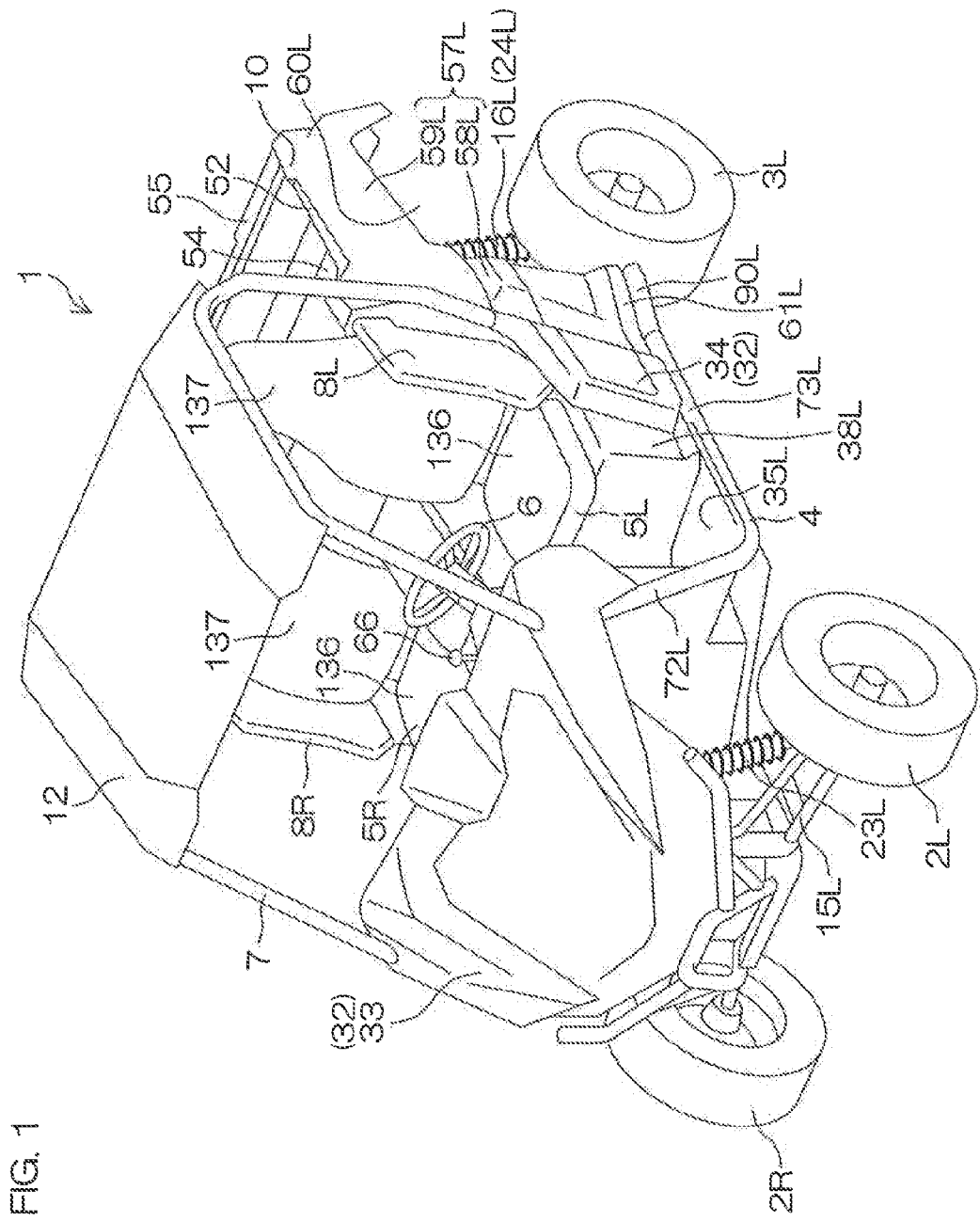
FIG. 1 is a perspective view of a vehicle according to a preferred embodiment of the present invention.
Figure 2:
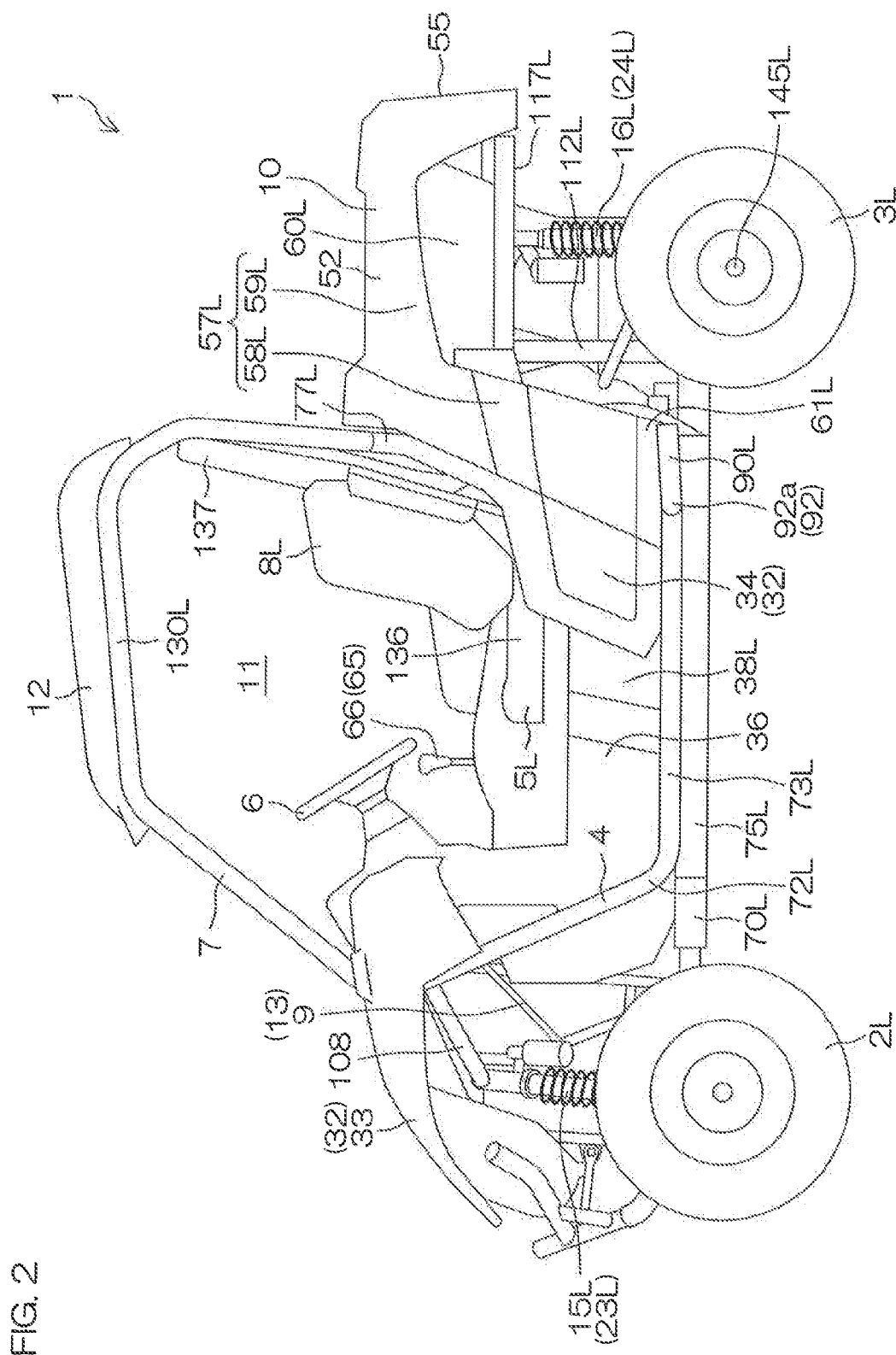
FIG. 2 is a left side view of the vehicle.
Figure 3:
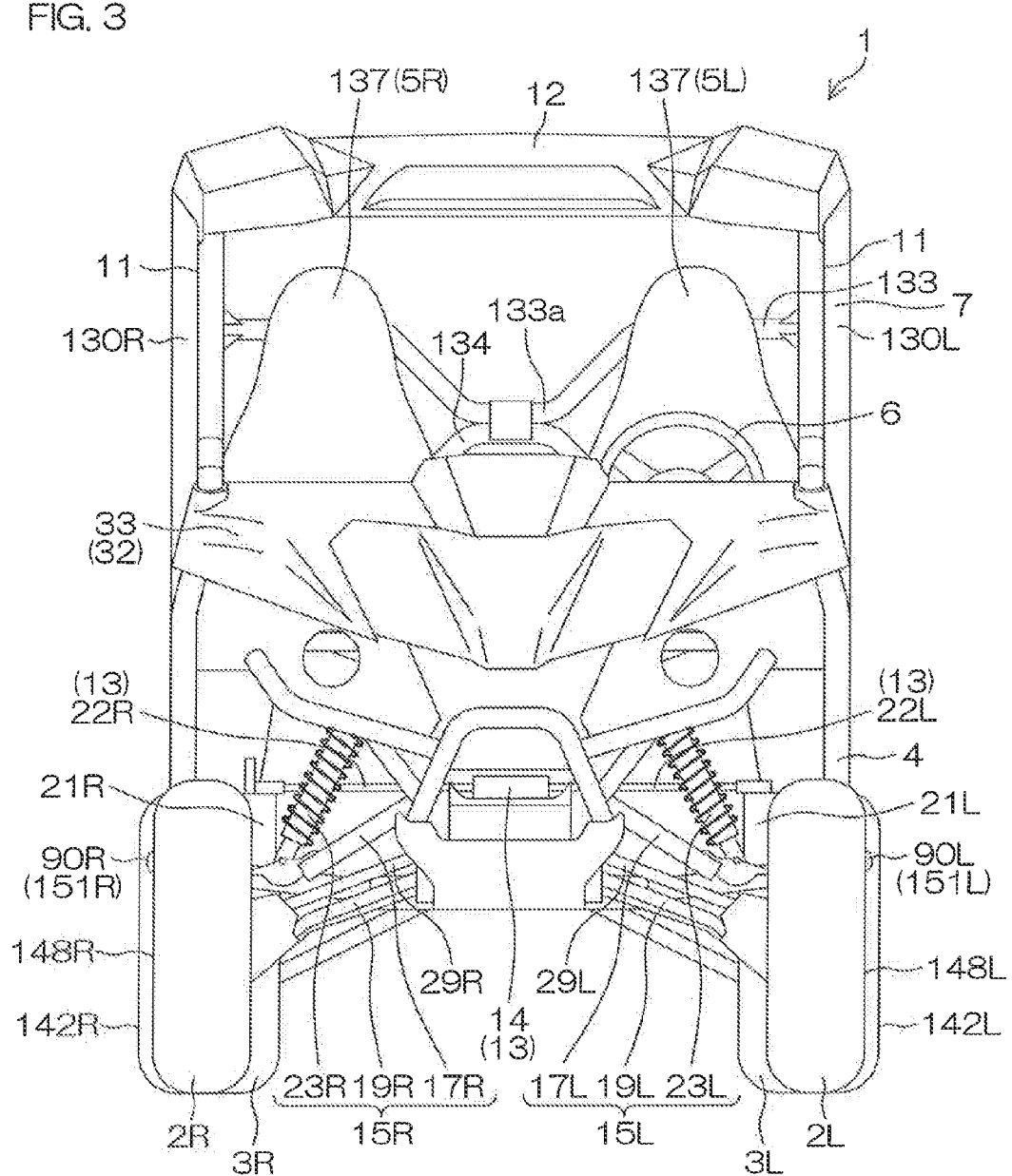
FIG. 3 is a front view of the vehicle.
Figure 4:
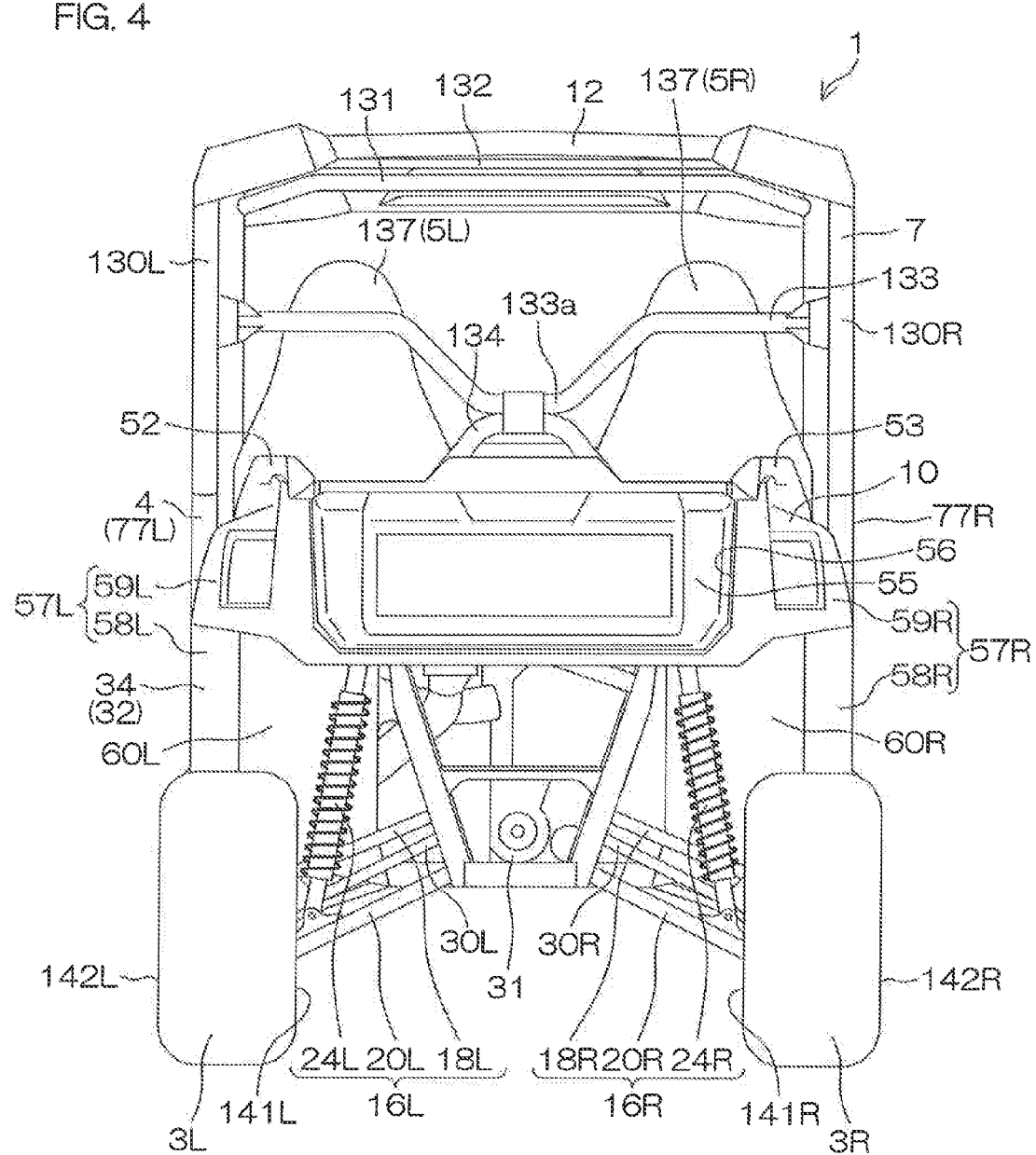
FIG. 4 is a back view of the vehicle.
Figure 5:
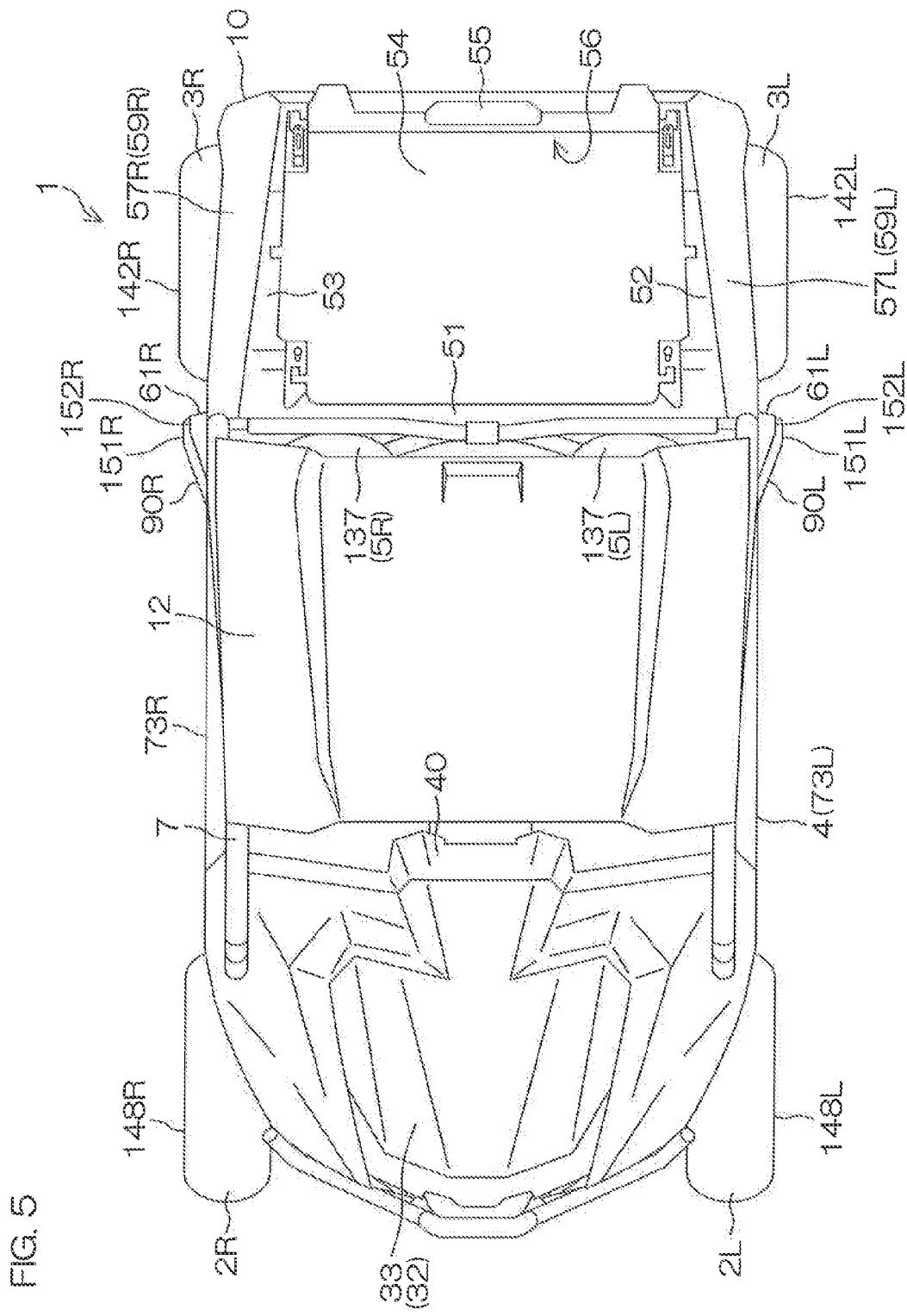
FIG. 5 is a plan view of the vehicle.
Figure 6:
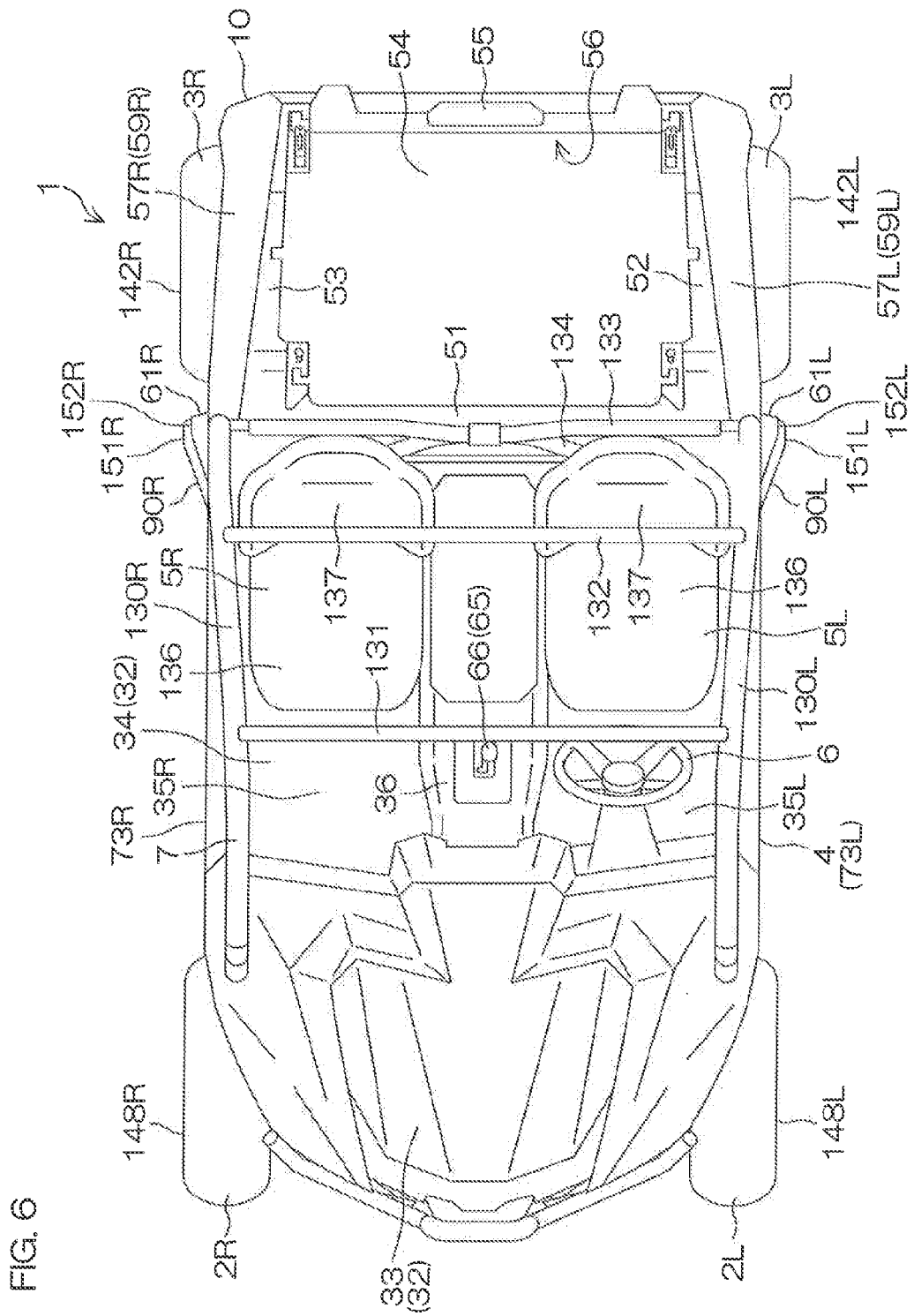
FIG. 6 is a plan view of the vehicle in a state where a roof is removed.

FIG. 1 is a perspective view of a vehicle according to a preferred embodiment of the present invention. FIG. 2 is a left side view of the vehicle, FIG. 3 is a front view thereof, FIG. 4 is a back view thereof, and FIG. 5 is a plan view thereof. FIG. 6 is a plan view of the vehicle in a state where a roof is removed.

A vehicle 1 of the present preferred embodiment belongs to a category of utility vehicles. More specifically, the vehicle 1 preferably is a four-wheel recreational off road vehicle, for example. The vehicle 1 includes a left front wheel 2L and a right front wheel 2R, a left rear wheel 3L and a right rear wheel 3R, a frame 4, seat units 5L and 5R, a steering wheel 6, a roll cage 7, bolsters 8L and 8R, and a cargo bed 10. The left front wheel 2L and the right front wheel 2R are arranged to the left and right, respectively. The left rear wheel 3L and the right rear wheel 3R are arranged rearward of the left front wheel 2L and the right front wheel 2R, respectively, and arranged to the left and right, respectively. The wheels 2L, 2R, 3L, and 3R each include a tire. The surface of the tire may be roughened in a block pattern to be suitable for running on an uneven ground.

The frame 4 is supported by the pair of front wheels 2L and 2R, and the pair of rear wheels 3L and 3R. The frame 4 supports the seat units 5L and 5R between the pair of front wheels 2L, 2R and the pair of rear wheels 3L, 3R. The steering wheel 6 is arranged forward of the seat units 5L and 5R. In the present preferred embodiment, the seat units 5L and 5R include the left seat unit 5L and the right seat unit 5R arranged to the left and right. One seat unit, which is the left seat unit 5L in the present preferred embodiment, is a driver's seat where a driver is seated to face forward. The steering wheel 6 is arranged forward of the left seat unit 5L. The steering wheel 6 is coupled to a steering shaft 9. The steering shaft 9 is mounted on the frame 4 such that the steering shaft 9 is rotatable around an axis thereof.

At a left side of the left seat unit 5L and at a right side of the right seat unit 5R, a left bolster 8L and a right bolster 8R are provided, respectively. The left bolster 8L is a plate-shaped member facing from the left side to a passenger (driver) seated on the left seat unit 5L. The left bolster 8L supports the passenger on the left seat unit 5L from the left side. The right bolster 8R is a plate-shaped member facing from the right side to the passenger seated on the right seat unit 5R. The right bolster 8R supports the passenger on the right seat unit 5R from the right side. The bolsters 8L and 8R are preferably made from a resin material, for example.

The roll cage 7 is attached to the frame 4. The roll cage 7 surrounds the seat units 5L and 5R, and defines openings 11, on left and right, respectively, through which the passenger gets in and out of the vehicle 1. Above the roll cage 7, a roof 12 is attached.

The cargo bed 10 is arranged rearward of the seat units 5L and 5R. The cargo bed 10 is supported by the frame 4.

The vehicle 1 is further provided with left-front and right-front suspension assemblies 15L and 15R that suspend each of the pair of front wheels 2L and 2R, and left-rear and right-rear suspension assemblies 16L and 16R that suspend each of the pair of rear wheels 3L and 3R. The frame 4 is supported, via the suspension assemblies 15L, 15R, 16L, and 16R, by the pair of front wheels 2L and 2R and the pair of rear wheels 3L and 3R.

In the present preferred embodiment, the suspension assemblies 15L, 15R, 16L, and 16R are each preferably of the double wishbone type, for example.

Specifically, the front suspension assemblies 15L and 15R each include upper arms 17L and 17R and lower arms 19L and 19R arranged on the top and bottom. Outer ends of the upper arms 17L and 17R and the lower arms 19L and 19R are coupled to knuckle arms 21L and 21R of the corresponding front wheels 2L and 2R, respectively. Inner ends of the upper arms 17L and 17R and the lower arms 19L and 19R are coupled pivotably to the frame 4. Near the outer ends of the upper arms 17L and 17R, lower ends of shock absorbers 23L and 23R are each coupled. Upper ends of the shock absorbers 23L and 23R are coupled to the frame 4.

Each of the rear suspension assemblies 16L and 16R includes upper arms 18L and 18R and lower arms 20L and 20R arranged on the top and bottom. Outer ends of the upper arms 18L and 18R and the lower arms 20L and 20R are each coupled to knuckle arms (not shown) of the corresponding rear wheels 3L and 3R. Inner ends of the upper arms 18L and 18R and the lower arms 20L and 20R are coupled pivotably to the frame 4. Near the outer ends of the lower arms 20L and 20R, lower ends of shock absorbers 24L and 24R are each coupled. Upper ends of the shock absorbers 24L and 24R are coupled to the frame 4.

Although not shown in the figure, axles of the wheels 2L, 2R, 3L, and 3R are supported rotatably by the corresponding knuckle arms. To these axles, corresponding drive shafts 29L, 29R, 30L, and 30R are coupled, respectively, via a constant-velocity universal joint (not shown). Power from an engine 31, which is a drive source, is transmitted to the drive shafts 29L, 29R, 30L, and 30R. The engine 31 is arranged between the seat units 5L and 5R and supported by the frame 4.

Further, the vehicle 1 includes a body panel 32 attached to the frame 4. In the present preferred embodiment, the body panel 32 is preferably made from a resin material. The body panel 32 includes a front cover 33 that covers a front portion of the vehicle 1 and a mid cover 34 that covers a central portion of the vehicle 1. The cargo bed 10 is arranged rearward of the mid cover 34. The front cover 33 covers the front suspension assemblies 15L and 15R. Further, the front cover 33 covers a steering mechanism 13 coupled to the steering wheel 6. The steering mechanism 13 includes the steering shaft 9 coupled to the steering wheel 6. Further, the steering mechanism 13 may include a rack and pinion mechanism 14 that converts the rotation of the steering shaft 9 into a linear motion in the left-right direction of the vehicle 1, and a pair of tie rods 22L and 22R. The pair of tie rods 22L and 22R each couple both ends of a rack shaft of the rack and pinion mechanism 14 and the knuckle arms 21L and 21R.

Figure 7:
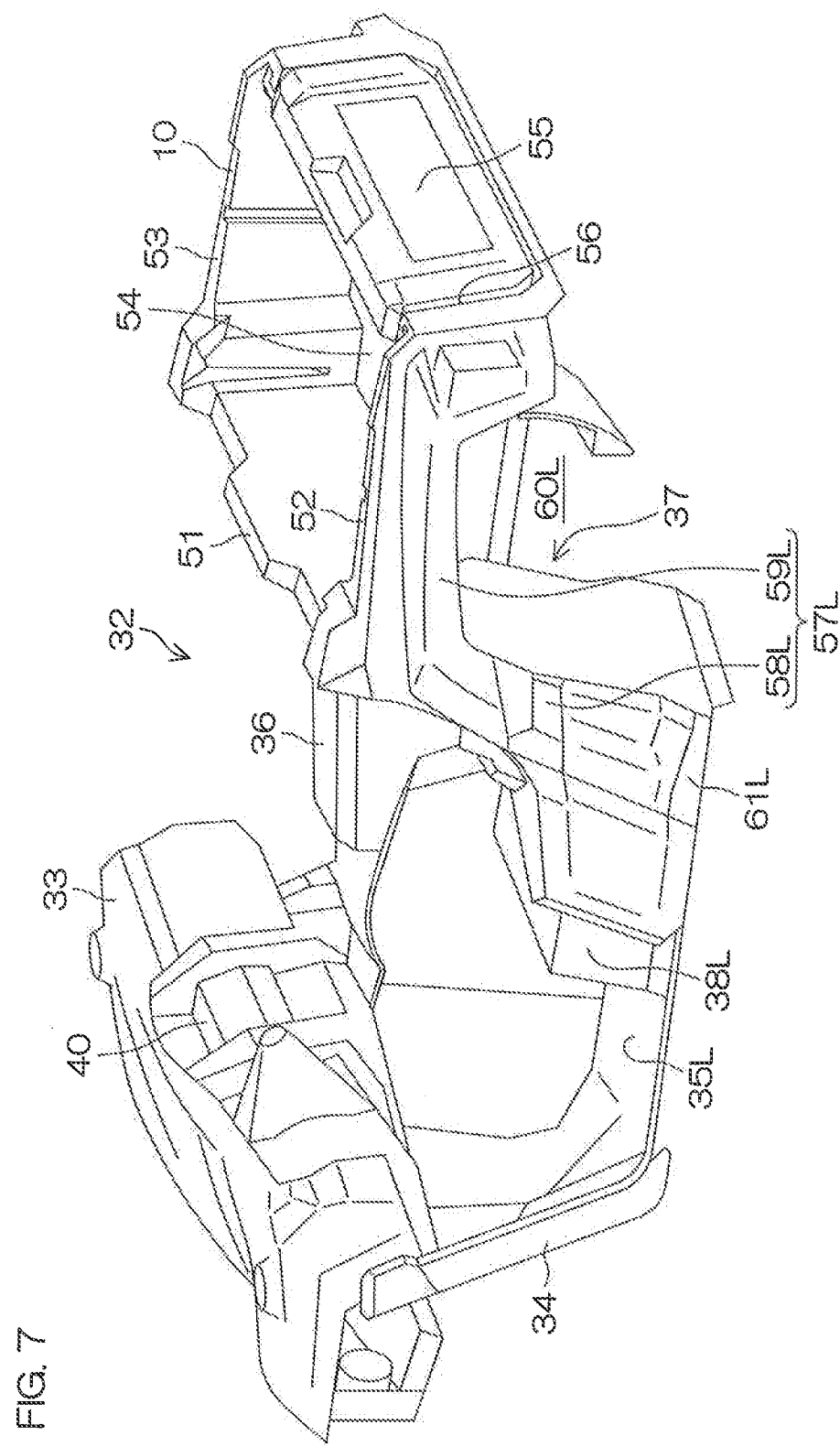
FIG. 7 is a perspective view of a body panel provided in the vehicle.

FIG. 7 is a perspective view of the body panel 32. The front portion of the mid cover 34 is coupled to the front cover 33. Further, the rear portion of the mid cover 34 is coupled to the cargo bed 10. The mid cover 34 includes a left floor portion 35L and a right floor portion 35R (see FIG. 6) forward of the left seat unit 5L and the right seat unit 5R, respectively. Between the left floor portion 35L and the right floor portion 35R, an elevated portion 36 elevated upward is arranged to extend in the front-back direction. Below the elevated portion 36, a tunnel space 37 (see FIG. 9 as well) is defined which penetrates in the front-back direction. The tunnel space 37 houses a drive force transmitting mechanism 69 used to transmit the drive force of the engine 31 to the four wheels 2L, 2R, 3L, and 3R (see FIG. 9).

Rearward of the left floor portion 35L and the right floor portion 35R, raised portions 38L and 38R (see FIG. 9 as well) covering the lower spaces of the left seat unit 5L and the right seat unit 5R from the front and the lateral side are provided, respectively. An instrument support portion 40 is arranged forward of the left floor portion 35L and the right floor portion 35R. The instrument support portion 40 is raised upward. Instruments (not shown) are held on the instrument support portion 40.

In the present preferred embodiment, the cargo bed 10 is preferably made from a resin material. The cargo bed 10 includes a front wall portion 51, a left-side wall portion 52, a right-side wall portion 53, a bottom wall portion 54, and a tail gate 55. The front wall portion 51 is raised upward at the back of the seat units 5L and 5R, and extends in the left-right direction. The left-side wall portion 52 is integrally coupled to a left side edge of the front wall portion 51, raised upward, and extends from the left side edge of the front wall portion 51 to the rear side. The right-side wall portion 53 is integrally coupled to a right side edge of the front wall portion 51, raised upward, and extends from the right side edge of the front wall portion 51 to the rear side. The left-side wall portion 52 and the right-side wall portion 53 face each other in the left-right direction, and each includes a parallel or substantially parallel inner wall surface. The bottom wall portion 54 is integrally coupled to a lower edge of the front wall portion 51, and extends from the lower edge of the front wall portion 51 toward the rear along or substantially along the horizontal surface. The bottom wall portion 54 preferably has a rectangular or substantially rectangular shape, and the left side edge is integrally coupled to the lower edge of the left-side wall portion 52 and the right side edge is integrally coupled to the lower edge of the right-side wall portion 53. A rear opening 56 is provided between the rear end of the left-side wall portion 52 and the rear end of the right-side wall portion 53. The tail gate 55 is attached removably between the rear end of the left-side wall portion 52 and the rear end of the right-side wall portion 53 so as to close the rear opening 56.

The body panel 32 includes a left rear wheel fender 57L that covers the left rear wheel 3L, and a right rear wheel fender 57R that covers the right rear wheel 3R (see FIG. 4, FIG. 5, etc.).

The left rear wheel fender 57L includes a first left fender portion 58L provided at a rear left side of the mid cover 34 and a second left fender portion 59L provided at a left side of the cargo bed 10. The first left fender portion 58L and the second left fender portion 59L are coupled to define a left-rear-wheel house 60L that covers the left rear wheel 3L.

Figure 14A:
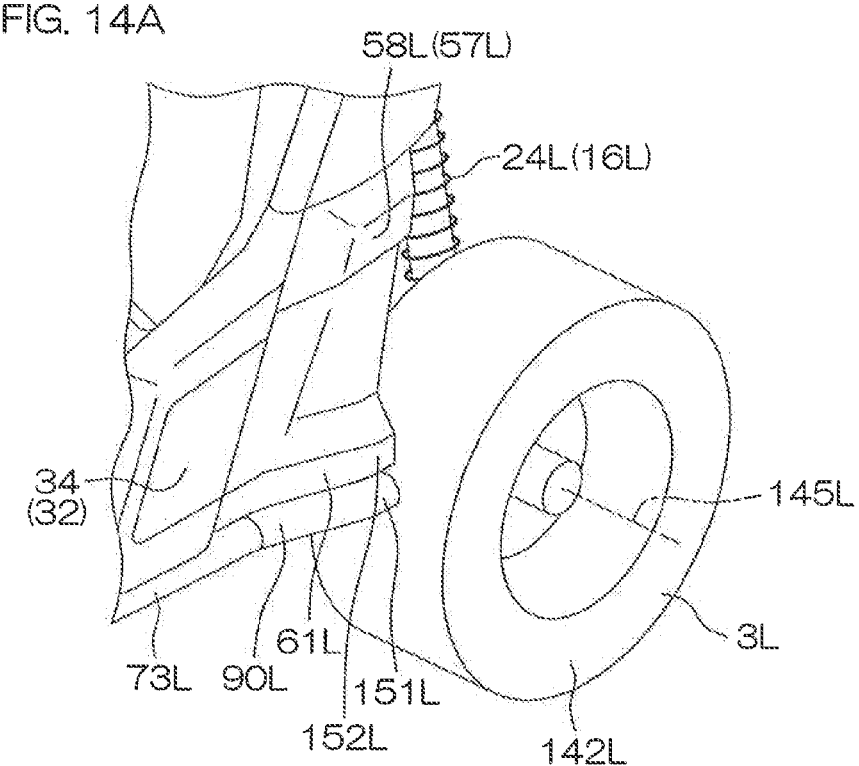
FIG. 14A is a partially enlarged perspective view of a portion near a left rear wheel.

The first left fender portion 58L includes a left protruded fender portion 61L at a lower end. The left protruded fender portion 61L is positioned forward of the left rear wheel 3L, and protrudes toward a left side or the outside of the vehicle 1. The left protruded fender portion 61L is preferably positioned at a height within the width, in the up-down direction, of the left rear wheel 3L, in a state where the vehicle 1 is motionless on the horizontal surface as shown in FIG. 2, FIG. 14A, etc. In other words, the left protruded fender portion 61L is preferably positioned at a height higher than the lower end of the left rear wheel 3L and lower than the upper end thereof. More specifically, the left protruded fender portion 61L is preferably positioned at a height higher than the rotation center 145L of the left rear wheel 3L and lower than the upper end thereof.

The second left fender portion 59L bulges outward (to a left side) from a position lower than the upper edge of the left-side wall portion 52 of the cargo bed 10. The second left fender portion 59L is positioned above the left rear wheel 3L, as viewed from the back (see FIG. 4), and covers the left rear wheel 3L from above. The inner edge of the second left fender portion 59L is integrally coupled to the left-side wall portion 52 of the cargo bed 10, and as viewed from the back, is positioned outside (at a left side) of an innermost end 141L of the left rear wheel 3L. The outer edge of the second left fender portion 59L is positioned, as viewed from the back, inside of an outermost end 142L of the left rear wheel 3L. An outermost end 152L (see FIG. 14A) of the left protruded fender portion 61L is positioned outside (at a left side) of the second left fender portion 59L.

Similarly, as presented in FIG. 4, the right rear wheel fender 57R includes a first right fender portion 58R defined at a rear right side of the mid cover 34 and a second right fender portion 59R defined at a right side of the cargo bed 10. The first right fender portion 58R and the second right fender portion 59R are coupled to define a right-rear wheel house 60R covering the right rear wheel 3R.

Figure 14B:
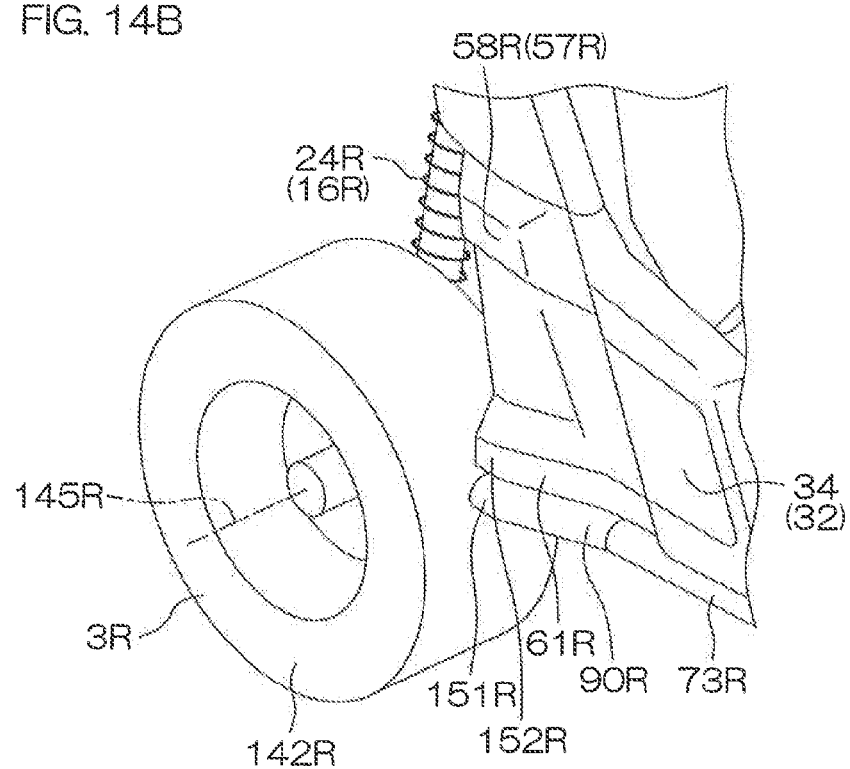
FIG. 14B is a partially enlarged perspective view of a portion near a right rear wheel.

The first right fender portion 58R includes a right protruded fender portion 61R (see FIG. 14B) at a lower end. The right protruded fender portion 61R is positioned forward of the right rear wheel 3R, and protrudes toward a right side or the outside of the vehicle 1. The right protruded fender portion 61R is preferably positioned at a height within the width, in the up-down direction, of the right rear wheel 3R, in a state where the vehicle 1 is motionless on the horizontal surface as shown in FIG. 14B. In other words, the right protruded fender portion 61R is preferably positioned at a height higher than the lower end of the right rear wheel 3R and lower than the upper end thereof. More specifically, the right protruded fender portion 61R is preferably positioned at a height higher than the rotation center 145R of the right rear wheel 3R and lower than the upper end thereof.

The second right fender portion 59R bulges outward (to the right side) from a position lower than the upper edge of the right-side wall portion 53 of the cargo bed 10. The second right fender portion 59R is positioned above the right rear wheel 3R, as viewed from the back (see FIG. 4), and covers the right rear wheel 3R from above. The inner edge of the second right fender portion 59R is integrally coupled to the right-side wall portion 53 of the cargo bed 10, and as viewed from the back, is positioned outside (at the right side) of an innermost end 141R of the right rear wheel 3R. The outer edge of the second right fender portion 59R is positioned, as viewed from the back, inside of an outermost end 142R of the right rear wheel 3R. An outermost end 152R (see FIG. 14B) of the right protruded fender portion 61R is positioned outside (at a left side) of the second right fender portion 59R.

Figure 8:
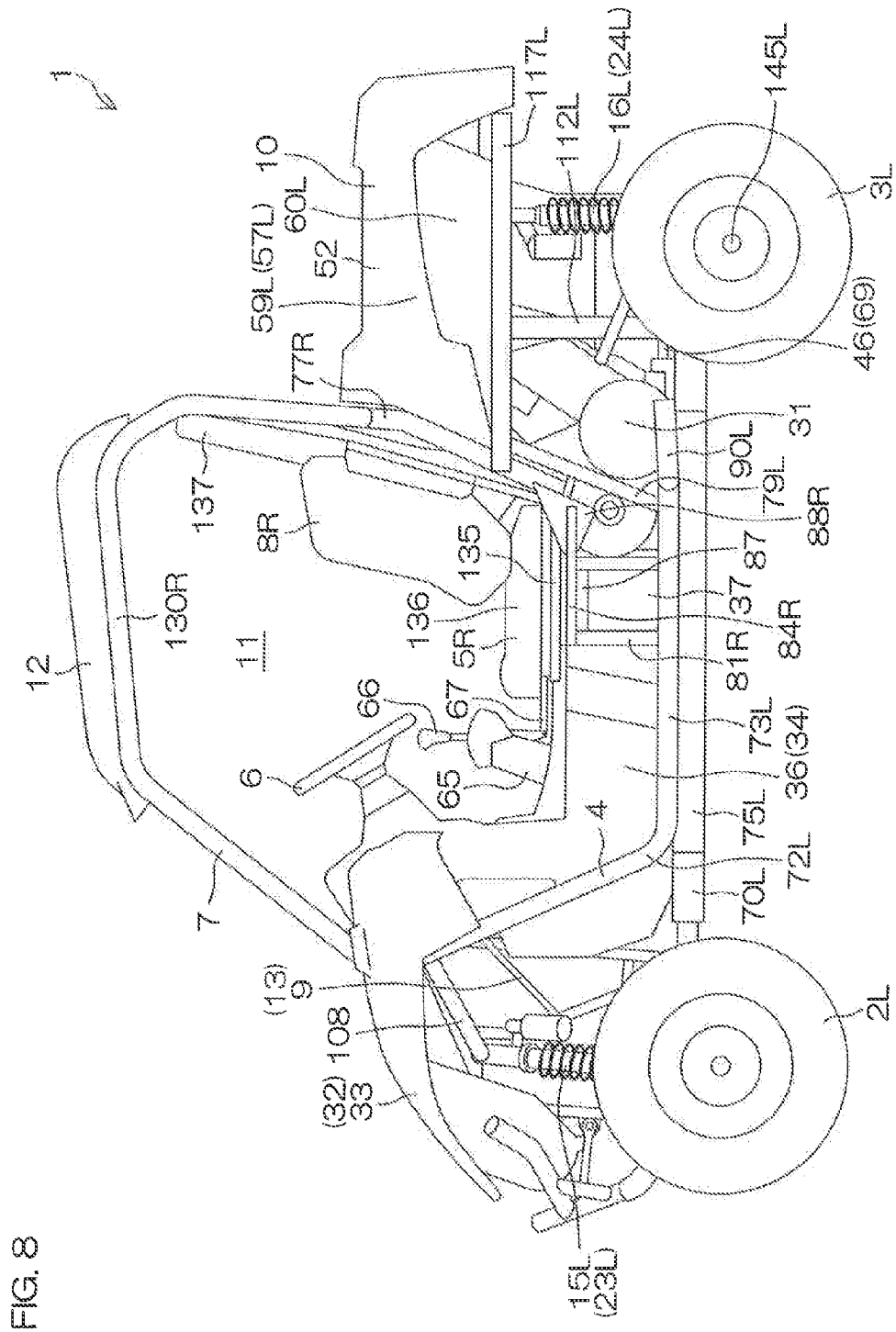
FIG. 8 is a side view showing an arrangement of an engine with a portion of the body panel removed.
Figure 9:
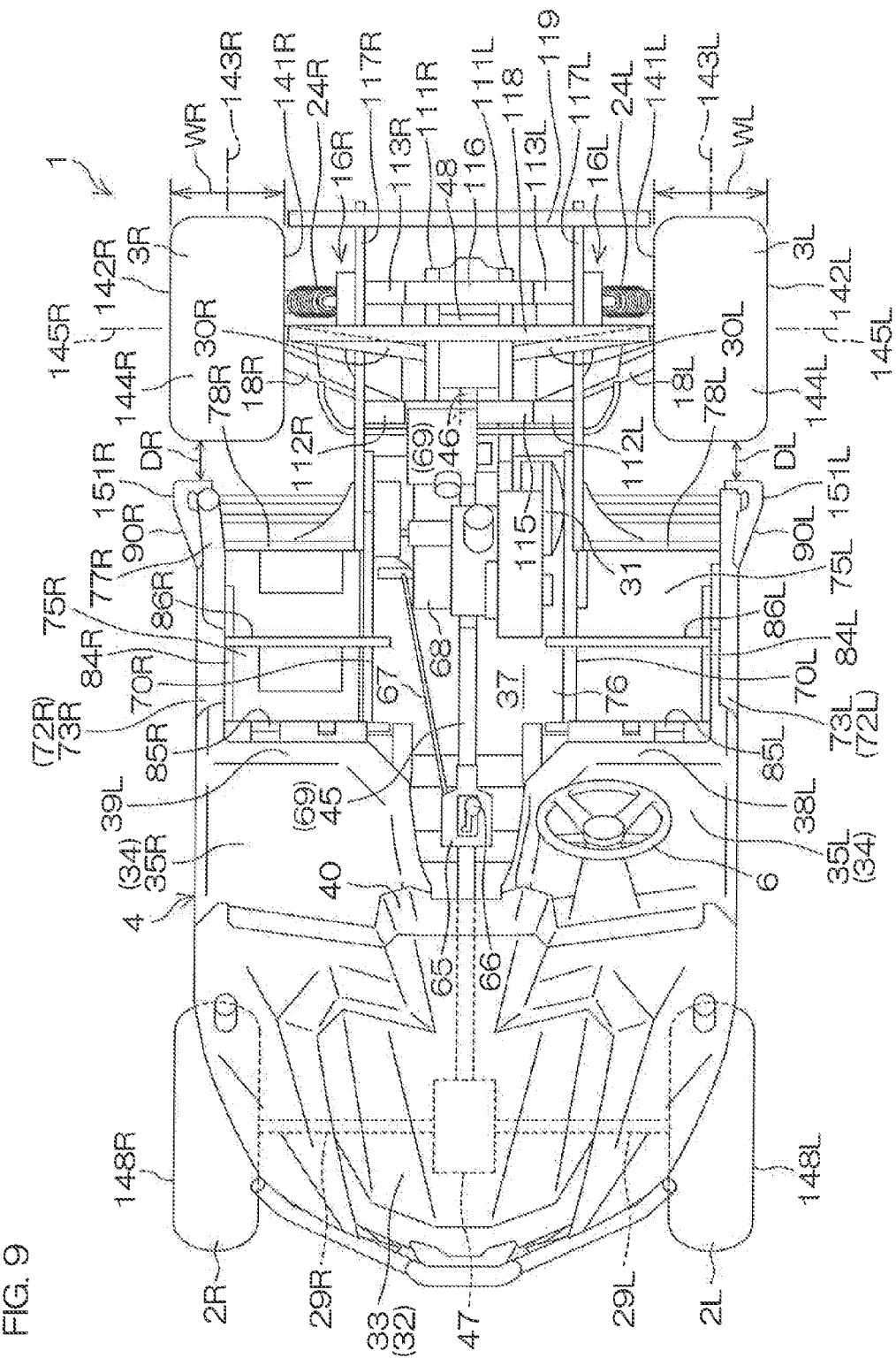
FIG. 9 is a plan view showing an arrangement of an engine with a roof, a cargo bed, etc., removed.

FIG. 8 is a side view showing an arrangement of an engine 31 with a portion of the mid cover 34 removed. FIG. 9 is a plan view showing an arrangement of the engine 31 with the roof 12, a portion of the mid cover 34, and the cargo bed 10 removed.

The engine 31 is arranged forward of the rear suspension assemblies 16L and 16R, and is arranged at the center or substantially the center of the width of the vehicle 1 in the left-right direction. In the left-right direction, the engine 31 is arranged between the left seat unit 5L and the right seat unit 5R. The center of gravity of the engine 31 is located in line or substantially in line with backrests 137 of the left seat unit 5L and the right seat unit 5R. A transmission lever unit 65 is arranged between the left and right floor portions 35L and 35R.

The transmission lever unit 65 includes a transmission lever 66 arranged to be operated by a driver. One end (front end) of an operation rod 67 is coupled to the transmission lever 66. The other end (rear end) of the operation rod 67 is coupled to a transmission unit 68 attached to the engine 31. The transmission unit 68 changes an output rotation speed of the engine 31 with a gear ratio of a gear stage selected from a plurality of gear stages. The rotation changed in speed is transmitted to the drive shafts 29L, 29R, 30L, and 30R via the drive force transmitting mechanism 69.

The drive force transmitting mechanism 69 includes a front propeller shaft 45, a rear propeller shaft 46, a front differential device 47, and a rear differential device 48. The front propeller shaft 45 and the rear propeller shaft 46 are output shafts of the transmission unit 68, and transmit the torque of the engine 31. The front propeller shaft 45 extends forward from the transmission unit 68, and the front differential device 47 is coupled to a front end of the front propeller shaft 45. The front differential device 47 transmits the torque from the front propeller shaft 45 to drive shafts 29L and 29R while permitting a rotation difference between the drive shafts 29L and 29R. The rear propeller shaft 46 extends rearward from the transmission unit 68, and the rear differential device 48 is coupled to a rear end of the rear propeller shaft 46. The rear differential device 48 transmits the torque from the rear propeller shaft 46 to drive shafts 30L and 30R while permitting a rotation difference between the drive shafts 30L and 30R.

Figure 10:
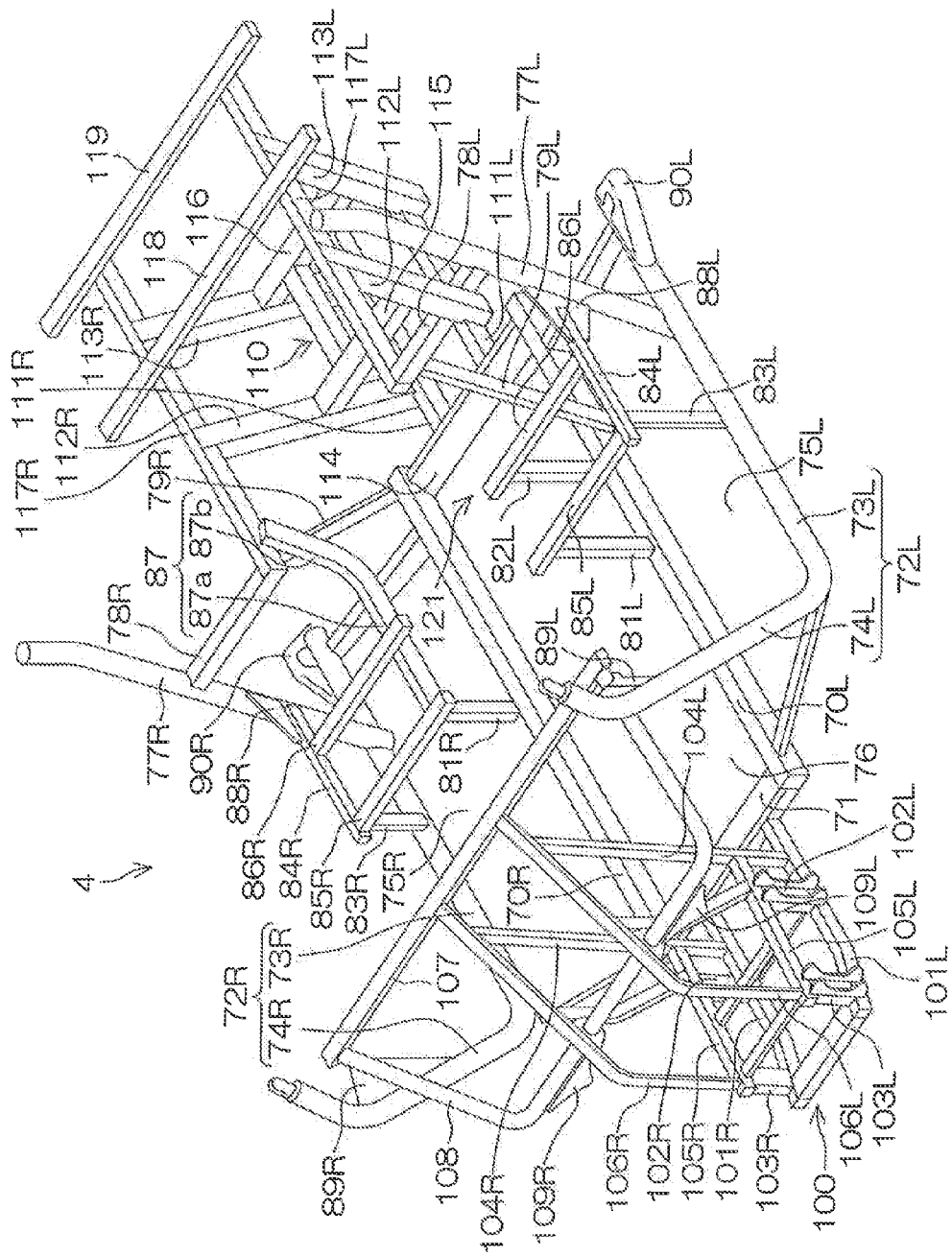
FIG. 10 is a perspective view of a frame provided in the vehicle.
Figure 11:
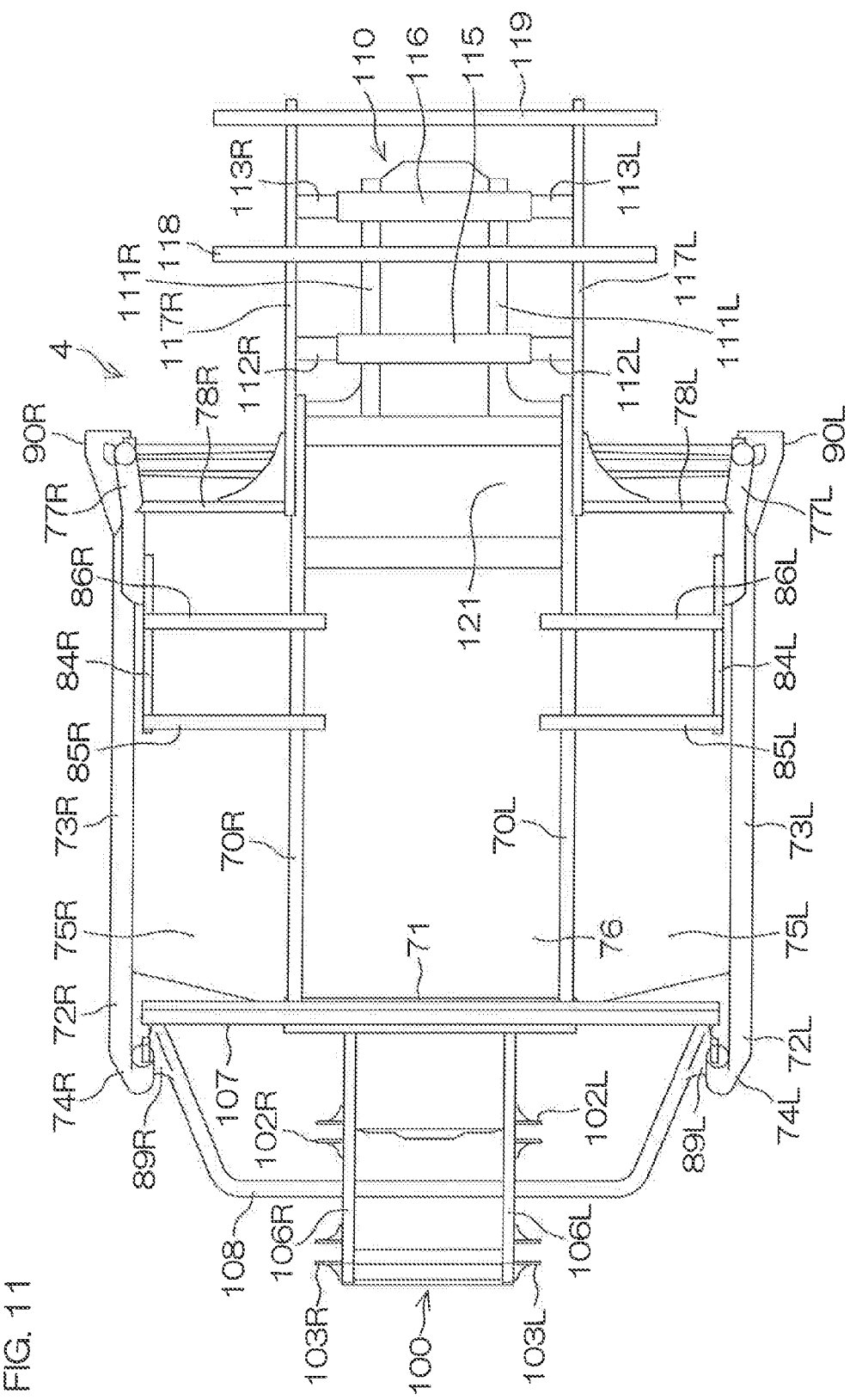
FIG. 11 is a plan view of the frame.
Figure 12:
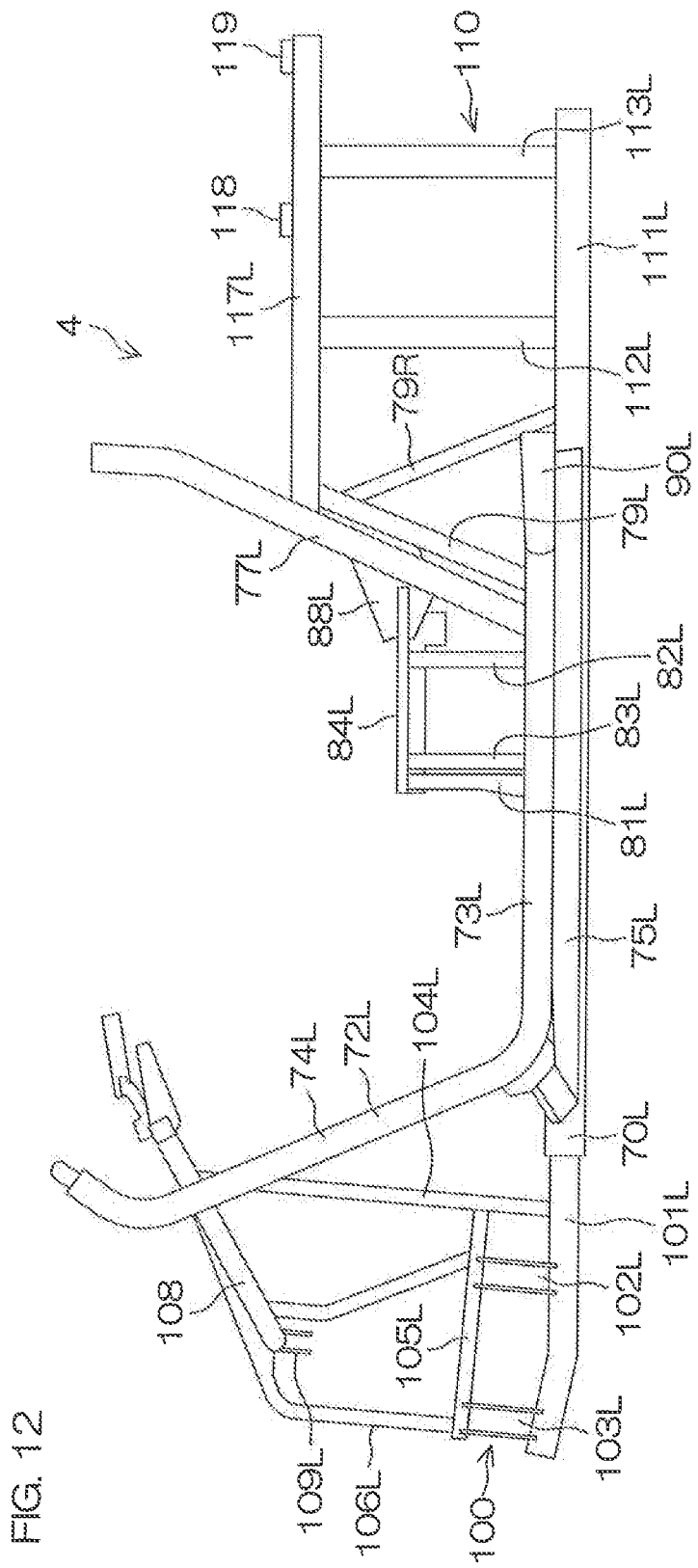
FIG. 12 is a left side view of the frame.

FIG. 10 is a perspective view of the frame 4, FIG. 11 is a plan view thereof, and FIG. 12 is a left side view thereof.

The frame 4 is preferably made from a metal material. The metal material may include iron, for example. Another metal material such as aluminum may be used.

The frame 4 includes a left side frame portion 70L and a right side frame portion 70R extending in the front-back direction. The left side frame portion 70L and the right side frame portion 70R are parallel or substantially parallel to each other. A cross member 71 extending in the left-right direction is provided, and front ends of the left and right side frame portions 70L and 70R are connected to the cross member 71. A left support frame portion 72L is spaced a distance outside (at a left side) of the left side frame portion 70L. Further, a right support frame portion 72R is spaced a distance outside (at a right side) of the right side frame portion 70R. The left support frame portion 72L and the right support frame portion 72R preferably are each L-shaped or substantially L-shaped, are arranged parallel or substantially parallel to each other, and face to each other in the left-right direction. The left support frame portion 72L includes a left frame portion 73L linearly extending in the front-back direction, and a left raised frame portion 74L obliquely extending from the front end of the left frame portion 73L toward a forward direction and an upward direction of the left frame portion 73L. Similarly, the right support frame portion 72R includes a right frame portion 73R linearly extending in the front-back direction, and a right raised frame portion 74R obliquely extending from the front end of the right frame portion 73R toward a forward direction and an upward direction of the right frame portion 73R. The left frame portion 73L is coupled to the left side frame portion 70L via a left plate frame portion 75L. The right frame portion 73R is coupled to the right side frame portion 70R via a right plate frame portion 75R.

The left side frame portion 70L and the right side frame portion 70R are coupled to each other by a central plate frame portion 76. The central plate frame portion 76 is disposed along or substantially along a horizontal surface. The left plate frame portion 75L is inclined to extend upward and toward a left direction. The right plate frame portion 75R is inclined to extend upward and toward a right direction. The left frame portion 73L and the right frame portion 73R are arranged at a position higher than the central plate frame portion 76. The left frame portion 73L and the right frame portion 73R face each other in the left-right direction, and are disposed at an equal height.

A left support frame portion 77L and a right support frame portion 77R are each provided to obliquely extend upward and rearward from the intermediate portions of the left frame portion 73L and the right frame portion 73R. The substantially center portions of the support frame portions 77L and 77R are linked to outer ends of cross members 78L and 78R extending in the left-right direction, respectively. A pair of support frame portions 79L and 79R are provided to link the cross members 78L, 78R and the left and right side frame portions 70L, 70R. The left support frame portion 79L obliquely extends upward and rearward from the intermediate portion of the left side frame portion 70L. The right support frame portion 79R obliquely extends upward and forward from the rear end of the right side frame portion 70R.

To support the left seat unit 5L, the frame 4 includes vertical support frame portions 81L, 82L, and 83L, and horizontal support frame portions 84L, 85L, and 86L. The left seat unit 5L is supported by being coupled to the horizontal support frame portions 85L and 86L and a linkage member 88L.

To support the right seat unit 5R, the frame 4 includes vertical support frame portions 81R and 83R, horizontal support frame portions 84R, 85R, and 86R, and an L-shaped or substantially L-shaped support frame portion 87. The L-shaped or substantially L-shaped support frame portion 87 includes a horizontal portion 87a horizontally extending in the front-back direction and a raised portion 87b raised from the rear end toward an obliquely rear direction. The right seat unit 5R is supported by being coupled to the horizontal support frame portions 85R and 86R and a linkage member 88R.

A rear end of the left frame portion 73L extends to a rear side with respect to the left plate frame portion 75L. A left protruded frame portion 90L is coupled to the rear end of the left frame portion 73L. The left protruded frame portion 90L is an example of a left protruded portion according to a preferred embodiment of the present invention. The left protruded frame portion 90L is preferably welded to the left frame portion 73L, for example. The left protruded frame portion 90L protrudes outward (to a left side) of the left frame portion 73L. Similarly, a rear end of the right frame portion 73R extends to a rear side with respect to the right plate frame portion 75R. A right protruded frame portion 90R is coupled to the rear end of the right frame portion 73R. The right protruded frame portion 90R is an example of a right protruded portion according to a preferred embodiment of the present invention. The right protruded frame portion 90R is preferably welded to the right frame portion 73R, for example. The right protruded frame portion 90R protrudes outward (to a right side) of the right frame portion 73R. In the present preferred embodiment, the protruded frame portions 90L and 90R are positioned rearward of the seat units 5L and 5R.

A front-wheel holding portion 100 is arranged forward of the left and right side frame portions 70L and 70R. The front-wheel holding portion 100 holds the front wheels 2L and 2R via the front suspension assemblies 15L and 15R. The front-wheel holding portion 100 includes a pair of side frame portions 101L and 101R extending from the cross member 71 toward a forward direction. The front-wheel holding portion 100 further includes a pair of support frame portions 102L and 102R each raised upward from the intermediate portions of the pair of side frame portions 101L and 101R. The front-wheel holding portion 100 further includes a pair of support frame portions 103L and 103R each raised upward from the front end of the pair of side frame portions 101L and 101R. The inner ends of the lower arm 19L of the left front suspension assembly 15L are pivotably coupled to the lower ends of the support frame portions 102L and 103L, and the inner ends of the upper arm 17L of the left front suspension assembly 15L are pivotably coupled to the upper ends of the support frame portions 102L and 103L. Similarly, the inner ends of the lower arm 19R of the right front suspension assembly 15R are pivotably coupled to the lower ends of the support frame portions 102R and 103R, and the inner ends of the upper arm 17R of the right front suspension assembly 15R are pivotably coupled to the upper ends of the support frame portions 102R and 103R.

The front-wheel holding portion 100 further includes support frame portions 104L and 104R, side frame portions 105L and 105R, and support frame portions 106L and 106R. Rear ends of the support frame portions 106L and 106R are coupled to a cross member 107 extending in the left-right direction.

Both ends of U-shaped or substantially U-shaped frame 108 are coupled to both ends of the cross member 107. The U-shaped or substantially U-shaped frame 108 is coupled to the intermediate portions of the support frame portions 106L and 106R. In the U-shaped or substantially U-shaped frame 108, support members 109L and 109R are provided at positions outside of the support frame portions 106L and 106R. Upper ends of the shock absorbers 23L and 23R are pivotably coupled to the support members 109L and 109R. Both ends of the U-shaped or substantially U-shaped frame 108 are coupled by linkage members 89L and 89R to the left support frame portion 72L and the right support frame portion 72R, respectively.

A rear-wheel holding portion 110 is arranged rearward of the left and right side frame portions 70L and 70R. The rear-wheel holding portion 110 holds the rear wheels 3L and 3R via the rear suspension assemblies 16L and 16R. The rear-wheel holding portion 110 includes a pair of side frame portions 111L and 111R. The rear-wheel holding portion 110 further includes a pair of support frame portions 112L and 112R extending outward and obliquely upward from the front end of the side frame portions 111L and 111R. The rear-wheel holding portion 110 further includes a pair of support frame portions 113L and 113R extending outward and obliquely upward from the rear end of the side frame portions 111L and 111R. The rear ends of the left and right side frame portions 70L and 70R are coupled by a cross member 114 extending in the left and right, and the pair of side frame portions 111L and 111R extend rearward from the cross member 114.

The inner ends of the lower arms 20L and 20R of the suspension assemblies 16L and 16R are pivotably coupled to the lower ends of the support frame portions 112L, 112R, 113L, and 113R. The inner ends of the upper arms 18L and 18R are pivotably coupled to the intermediate portions of the support frame portions 112L, 112R, 113L, and 113R.

The rear-wheel holding portion 110 further includes a cross member 115, cross members 116, 118, and 119, and a pair of side frame portions 117L and 117R. Front ends of the side frame portions 117L and 117R are coupled to the inner ends of the cross members 78L and 78R, respectively. Rear ends of the side frame portions 117L and 117R are coupled to the cross member 118 which extends in the left-right direction at a position forward of the support frame portions 113L and 113R. Upper ends of the shock absorbers 24L and 24R are pivotably coupled to both ends of the cross member 118.

The cargo bed 10 is supported by the pair of side frame portions 117L and 117R. To the front end of the right-side side frame portions 117R, an upper end of the raised portion 87b of the L-shaped or substantially L-shaped support frame portion 87 is coupled.

An engine mount region 121 in which the engine 31 is mounted is set forward of the cross member 114 at a rear portion of the central plate frame portion 76.

As shown in FIG. 2, FIG. 4, FIG. 6, FIG. 8, etc., the roll cage 7 includes a pair of left and right side cage members 130L and 130R extending in the front-back direction, a pair of roof members 131 and 132 extending in the left-right direction, and a cross member 133 extending in the left-right direction.

The side cage members 130L and 130R are of a substantially reverse U-shaped or substantially reverse U-shaped, as viewed from its side. Front ends of the side cage members 130L and 130R are coupled to upper ends of the support frame portions 72L and 72R of the frame 4. Rear ends of the side cage members 130L and 130R are coupled to upper ends of the support frame portions 77L and 77R.

The roof members 131 and 132 extend in the left-right direction and couple upper portions of the side cage members 130L and 130R. The roof members 131 and 132 are arranged, one behind the other, with a space therebetween, face each other in the front-back direction, and are parallel or substantially parallel to each other.

The cross member 133 extends in the left-right direction to couple rear portions of the side cage members 130L and 130R. As best shown in FIG. 4, at a center portion in the left-right direction, the cross member 133 includes a crank-shaped portion 133a that is substantially U-shaped or substantially U-shaped which is recessed downward. A lower end of the crank-shaped portion 133a is coupled to the support member 134. The support member 134 is of a substantially reverse U-shaped or substantially reverse U-shaped, as viewed from rear. The crank-shaped portion 133a of the cross member 133 is coupled to an upper end of the support member 134. Two lower ends of the support member 134 are detachably coupled to the front ends of the side frame portions 117L and 117R (see FIG. 10).

The side cage members 130L and 130R and the support frame portions 72L and 72R define the openings 11 through which a passenger gets in and out in the left-right direction. The openings 11 communicate a passenger's occupying space with the outside. That is, the vehicle 1 is provided with an open occupying space and is not provided with a member defining a closed vehicle compartment.

The seat units 5L and 5R each include a seat frame 135, a seat 136, and the backrest 137. The seat 136 is coupled to the seat frame 135. The seat frame 135 is coupled to the horizontal support frame portions 85L, 86L; 85R, 85L of the frame 4. The backrest 137 is coupled, via the linkage members 88L and 88R (see FIG. 10), to the support frame portions 77L and 77R.

Figure 13A:
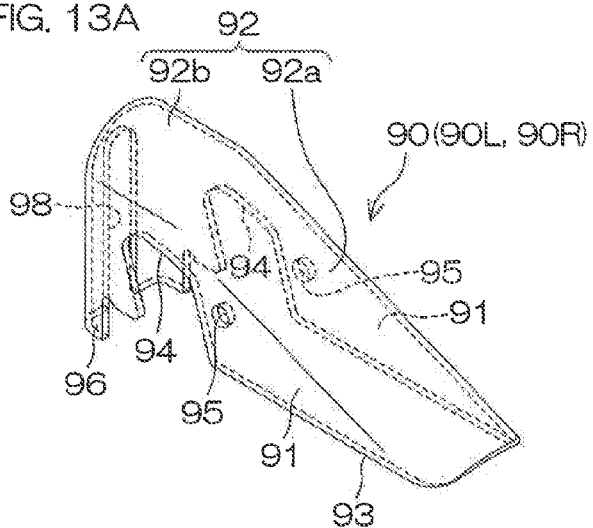
FIG. 13A is a perspective view of a protruded frame portion.
Figure 13D:
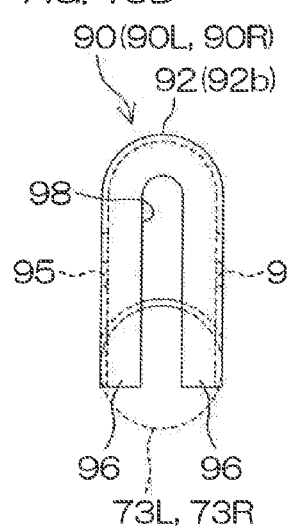
FIG. 13D is a back view of the protruded frame portion.
Figure 13B:
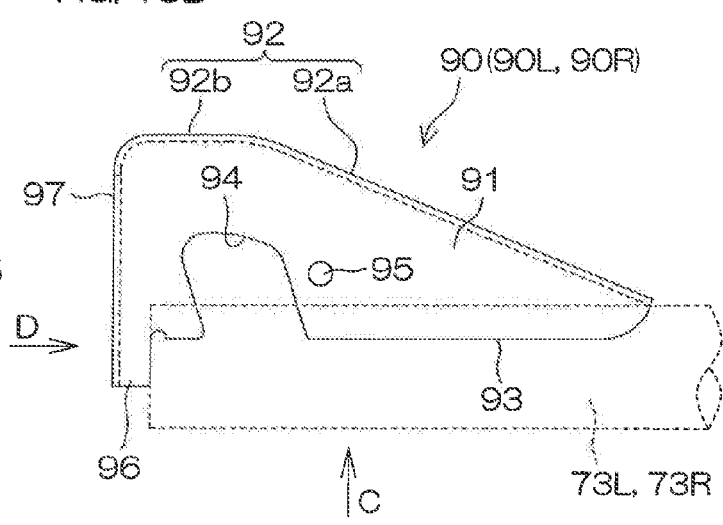
FIG. 13B is a plan view of the protruded frame portion.
Figure 13C:
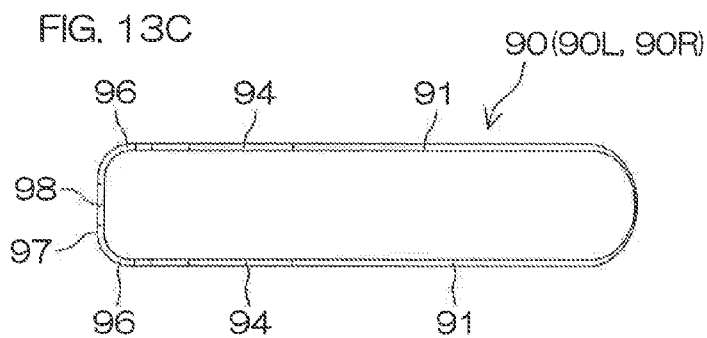
FIG. 13C is a side view of the protruded frame portion.

FIG. 13A is a perspective view of the protruded frame portion. FIG. 13B is a plan view thereof, FIG. 13C is a side view as viewed in a direction of an arrow C in FIG. 13B, and FIG. 13D is a back view as viewed in a direction of an arrow D in FIG. 13B.

In the present preferred embodiment, the left protruded frame portion 90L and the right protruded frame portion 90R preferably have a common structure, and the protruded frame portion 90 having a configuration shown in FIG. 13A to FIG. 13D is preferably commonly applied to the protruded frame portions 90L and 90R. In the present preferred embodiment, the protruded frame portion 90 is preferably manufactured by processing a metal plate, for example. The protruded frame portion 90 includes a pair of support plate portions 91 facing each other, and a guide portion 92 that couples the pair of support plate portions 91.

The support plate portion 91 is a flat plate having a trapezoidal or substantially trapezoidal shape in a plan view. Rearward of inner sides 93 of the support plate portion 91, an outward notch 94 is provided. Forward of the notch 94, a hole 95 that penetrates the support plate portion 91 is provided. The support plate portion 91 includes a protrusion 96 arranged rearward of the notch 94 and protruding inward of the inner side 93. A rear end edge 97 of the support plate portion 91 extends in the left-right direction. The inner side 93 is preferably welded to the left frame portion 73L of the frame 4 or to the right frame portion 73R thereof. The left frame portion 73L and the right frame portion 73R are each of tubular shape in this preferred embodiment.

The support plate portions 91 are positioned along or substantially along a horizontal surface when fixed to the left frame portion 73L or to the right frame portion 73R. As a result, the protruded frame portion 90 protrudes outward from the left frame portion 73L or the right frame portion 73R with the same or substantially the same height as those of the portions 73L and 73R. The direction into which the protruded frame portion 90 protrudes crosses the direction along which the left frame portion 73L or the right frame portion 73R extends. A protrusion 96 of the rear end edge 97 is positioned rearward of the rear end of the left frame portion 73L or the right frame portion 73R to partially cover the rear end thereof. The protrusion 96 is preferably welded to the rear end of the left frame portion 73L or the right frame portion 73R. The rear end edges 97 of the pair of support plate portions 91 are bent in a direction to come close to each other, and define a slot 98 extending in the left-right direction.

The guide portion 92 includes a tapered portion 92a extending in an obliquely outward rear direction, and a side surface portion 92b that is continuous with the rear end of the tapered portion 92a and extends in the front-back direction. A front end of the tapered portion 92a contacts an outside surface of the left frame portion 73L or the right frame portion 73R. A length in a front-back direction of the tapered portion 92a is longer than a length in a front-back direction of the side surface portion 92b. A length (width), in a left-right direction, of the tapered portion 92a is shorter than a length in a front-back direction of the tapered portion 92a. The tapered portion 92a linearly extends in a plan view. The side surface portion 92b linearly extends in a plan view.

Figure 16A:
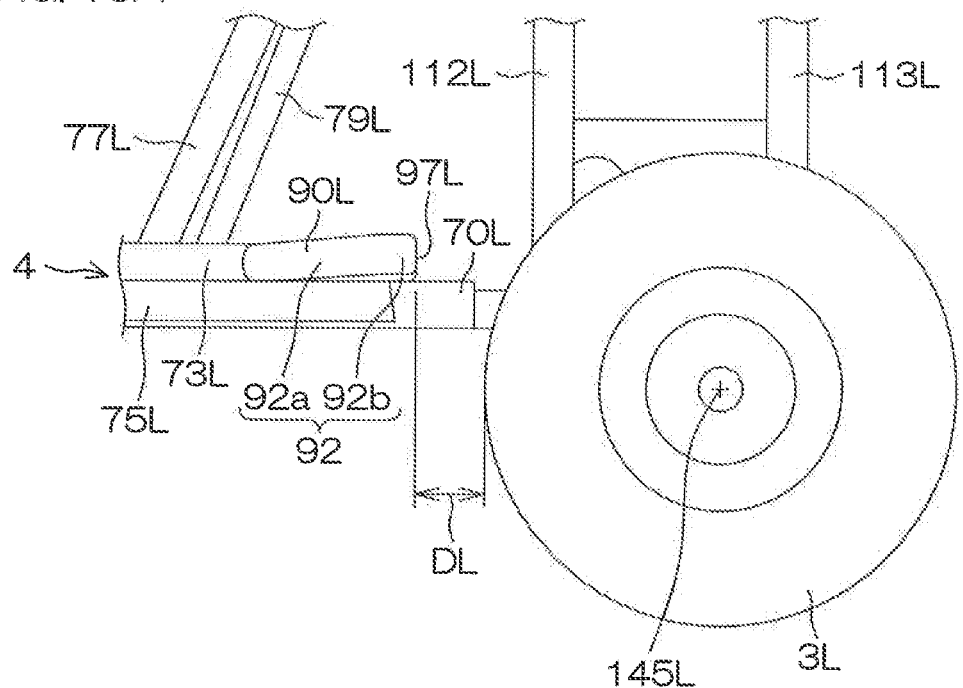
FIG. 16A is a partial side view showing the positional relationship between the left rear wheel and the frame.
Figure 16B:
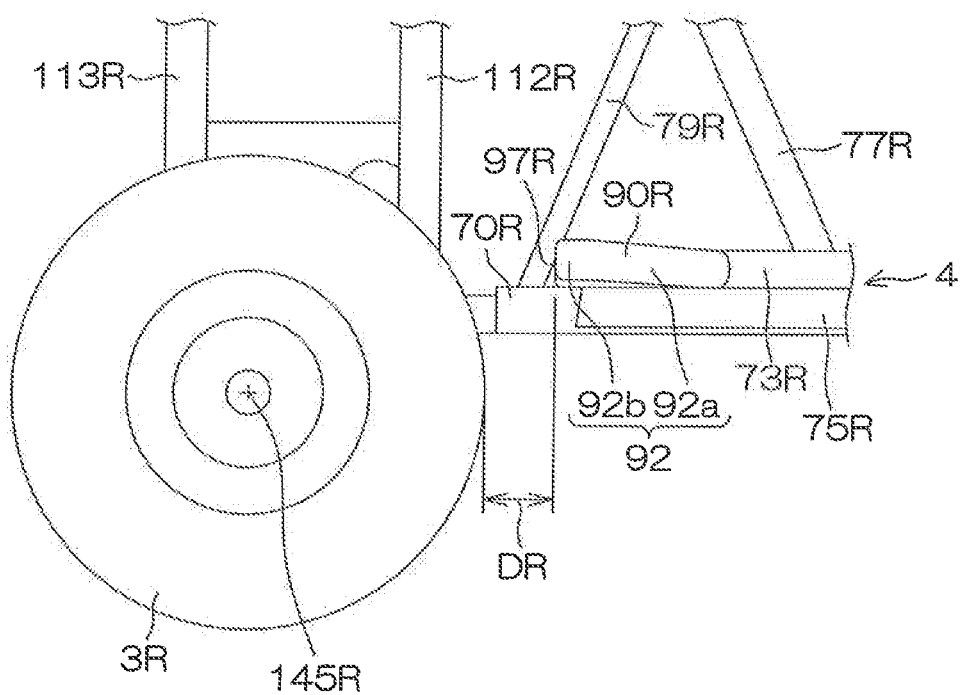
FIG. 16B is a partial side view showing the positional relationship between the right rear wheel and the frame.

FIG. 14A is an enlarged perspective view of a portion near the left rear wheel, and FIG. 14B is an enlarged perspective view of a portion near the right rear wheel. FIG. 15A is a plan view showing a positional relationship between the left rear wheel and the frame, and FIG. 15B is a plan view showing a positional relationship between the right rear wheel and the frame. FIG. 16A is a left side view showing a positional relationship between the left rear wheel and the frame, and FIG. 16B is a right side view showing a positional relationship between the right rear wheel and the frame.

The left frame portion 73L is located at a left-right direction position within a range of a width, in the left-right direction, of the left rear wheel 3L. That is, the left frame portion 73L is positioned outside of the innermost end 141L of the left rear wheel 3L and inside of the outermost end 142L of the left rear wheel 3L. In the present preferred embodiment, the left frame portion 73L is positioned outside of a left-right direction center position 143L of the left rear wheel 3L. The left protruded frame portion 90L is positioned inside (at a right side) of the left rear wheel 3L. More specifically, an outermost end 151L of the left protruded frame portion 90L is positioned slightly inside (at a right side) of the outermost end 142L of the left rear wheel 3L.

A length (specifically, a horizontal distance in a plan view) DL between the rear end edge 97L of the left protruded frame portion 90L and a surface 144L of the left rear wheel 3L is shorter than a width WL, in a left-right direction, of the left rear wheel 3L. Thus, the rear end edge 97L of the left protruded frame portion 90L is sufficiently close to the left rear wheel 3L.

The left protruded frame portion 90L is positioned at a height within a range of a width in an up-down direction of the left rear wheel 3L. The height of the left protruded frame portion 90L is preferably proximate the height of the rotation center 145L (axle) of the left rear wheel 3L. The left rear suspension assembly 16L varies the relationship in height between the left protruded frame portion 90L and the left rear wheel 3L while the vehicle 1 is running. It is preferable that when the vehicle 1 is motionless on a horizontal surface, the left protruded frame portion 90L is positioned at a height within a range of a width, in the up-down direction, of the left rear wheel 3L. It is more preferable that even when the relationship in height between the left protruded frame portion 90L and the left rear wheel 3L is changed while the vehicle 1 is running, the left protruded frame portion 90L is positioned at a height within a range of a width, in the up-down direction, of the left rear wheel 3L.

Similarly, the right frame portion 73R is located at a left-right direction position within a range of a width, in the left-right direction, of the right rear wheel 3R. That is, the right frame portion 73R is positioned outside of the innermost end 141R of the right rear wheel 3R and inside of the outermost end 142R of the right rear wheel 3R. In the present preferred embodiment, the right frame portion 73R is positioned outside of a left-right direction center position 143R of the right rear wheel 3R. The right protruded frame portion 90R is positioned inside (at a left side) of the right rear wheel 3R. More specifically, an outermost end 151R of the right protruded frame portion 90R is positioned slightly inside (at a left side) of the outermost end 142R of the right rear wheel 3R.

A length (specifically, a horizontal distance in a plan view) DR between the rear end edge 97R of the right protruded frame portion 90R and a surface 144R of the right rear wheel 3R is shorter than a width WR, in a left-right direction, of the right rear wheel 3R. Thus, the rear end edge 97R of the right protruded frame portion 90R is sufficiently close to the right rear wheel 3R.

The right protruded frame portion 90R is positioned at a height within a range of a width in an up-down direction of the right rear wheel 3R. The height of the right protruded frame portion 90R is preferably proximate the height of the rotation center 145R (axle) of the right rear wheel 3R. The right rear suspension assembly 16R varies the relationship in height between the right protruded frame portion 90R and the right rear wheel 3R while the vehicle 1 is running. It is preferable that when the vehicle 1 is motionless on a horizontal surface, the right protruded frame portion 90R is positioned at a height within a range of a width, in the up-down direction, of the right rear wheel 3R. It is more preferable that even when the relationship in height between the right protruded frame portion 90R and the right rear wheel 3R is changed while the vehicle 1 is running, the right protruded frame portion 90R is positioned at a height within a range of a width, in the up-down direction, of the right rear wheel 3R.

As shown in FIG. 14A, the left protruded fender portion 61L of the left rear wheel fender 57L is positioned inside of the left protruded frame portion 90L. More specifically, the outermost end 152L of the left protruded fender portion 61L (that is, the outermost end of the left rear wheel fender 57L) lies inside of the outermost end 151L of the left protruded frame portion 90L.

Similarly, as shown in FIG. 14B, the right protruded fender portion 61R of the right rear wheel fender 57R is positioned inside of the right protruded frame portion 90R. More specifically, the outermost end 152R of the right protruded fender portion 61R (that is, the outermost end of the right rear wheel fender 57R) lies inside of the outermost end 151R of the right protruded frame portion 90R.

As shown in FIG. 3, in a front view, from outside to inside, the left rear wheel 3L, the left protruded frame portion 90L, and the left front wheel 2L are arranged in this order. Similarly, in the front view, from outside to inside, the right rear wheel 3R, the right protruded frame portion 90R, and the right front wheel 2R are arranged in this order. More specifically, in the front view, from outside to inside, the outermost end 142L of the left rear wheel 3L, the outermost end 151L of the left protruded frame portion 90L, and the outermost end 148L of the left front wheel 2L are arranged in this order. Further, in the front view, from outside to inside, the outermost end 142R of the right rear wheel 3R, the outermost end 151R of the right protruded frame portion 90R, and the outermost end 148R of the right front wheel 2R are arranged in this order.

As shown in FIG. 5, FIG. 6, FIG. 15A, etc., in a plan view, from outside to inside, the left rear wheel 3L, the left protruded frame portion 90L, and the left rear wheel fender 57L are arranged in this order. Further, similarly, in the plan view, from outside to inside, the right rear wheel 3R, the right protruded frame portion 90R, and the right rear wheel fender 57R are arranged in this order. More specifically, in the plan view, from outside to inside, the outermost end 142L of the left rear wheel 3L, the outermost end 151L of the left protruded frame portion 90L, and the outermost end 152L of the left rear wheel fender 57L are arranged in this order. Similarly, in the plan view, from outside to inside, the outermost end 142R of the right rear wheel 3R, the outermost end 151R of the right protruded frame portion 90R, and the outermost end 142L of the right rear wheel fender 57R are arranged in this order.

Further, as shown in FIG. 6, a distance between the outermost ends 142L and 142R of left and right rear wheels 3L and 3R is longer than a distance between the outermost ends 148L and 148R of the left and right front wheels 2L and 2R. Further, a distance between the outermost ends 151L and 151R of left and right protruded frame portions 90L and 90R is longer than a distance between the outermost ends 148L and 148R of the left and right front wheels 2L and 2R, and shorter than a distance between the outermost ends 142L and 142R of the left and right rear wheels 3L and 3R. Thus, with the protruded frame portions 90L and 90R, it is possible to prevent the rear wheels 3L and 3R from being damaged while maintaining the width of the vehicle 1 in a range not exceeding the outermost ends 142L and 142R of the left and right rear wheels 3L and 3R. Therefore, it is possible to provide a compact, highly reliable vehicle 1.

As described above, according to the configuration of the present preferred embodiment, the left protruded frame portion 90L supported by the left frame portion 73L is arranged forward of the left rear wheel 3L, and protrudes toward the left side with respect to the left frame portion 73L. Similarly, the right protruded frame portion 90R supported by the right frame portion 73R is arranged forward of the right rear wheel 3R and protrudes toward the right side with respect to the right frame portion 73R. Further, in the front view, from outside to inside, the left rear wheel 3L, the left protruded frame portion 90L, and the left front wheel 2L are arranged in this order. Moreover, in the front view, from outside to inside, the right rear wheel 3R, the right protruded frame portion 90R, and the right front wheel 2R are arranged in this order.

The left frame portion 73L is positioned inside of the left rear wheel 3L. Similarly, the right frame portion 73R is positioned inside of the right rear wheel 3R. Therefore, a distance between the left frame portion 73L and the right frame portion 73R is short, and a compact vehicle body is provided. In particular, it is possible to narrow the vehicle width to provide a vehicle capable of running on a narrow road.

The left protruded frame portion 90L and the right protruded frame portion 90R, which are positioned forward of the rear wheels 3L and 3R, first hit an obstacle such as a tree or a rock to clear out the obstacle from forward of the rear wheels 3L and 3R. In this way, it is possible to avoid a situation where the rear wheels 3L and 3R are damaged by the obstacle. The left protruded frame portion 90L and the right protruded frame portion 90R are each positioned outside of the left front wheel 2L and the right front wheel 2R, and it is thus possible to effectively clear out the obstacle.

Further, in the present preferred embodiment, the left protruded frame portion 90L is provided at the rear end of the left frame portion 73L, and the right protruded frame portion 90R is provided at the rear end of the right frame portion 73R. With this arrangement, it is possible to arrange the left protruded frame portion 90L close to the left rear wheel 3L, and it is possible to arrange the right protruded frame portion 90R close to the right rear wheel 3R. Therefore, immediately before each of the left rear wheel 3L and the right rear wheel 3R, the left protruded frame portion 90L and the right protruded frame portion 90R clear out the obstacle. As a result, it is possible to more reliably prevent damage to the left rear wheel 3L and the right rear wheel 3R.

Further, in the present preferred embodiment, the outermost end 151L of the left protruded frame portion 90L is positioned outside of the outermost end 148L of the left front wheel 2L. In other words, a left end of the left protruded frame portion 90L is positioned at a left side with respect to a left end of the left front wheel 2L. Similarly, the outermost end 151R of the right protruded frame portion 90R is positioned outside of the outermost end 148R of the right front wheel 2R. In other words, a right end of the right protruded frame portion 90R is positioned at a right side with respect to a right end of the right front wheel 2R. Therefore, the left protruded frame portion 90L and the right protruded frame portion 90R bulge sufficiently outward, and thus it is possible to reliably protect the rear wheels 3L and 3R from damage caused by the obstacle.

Further, in the present preferred embodiment, the left protruded frame portion 90L and the right protruded frame portion 90R each protrude outward from the linearly extending left frame portion 73L and right frame portion 73R. Thus, forward of the rear wheels 3L and 3R, the obstacle is guided to outside of the vehicle 1 to be cleared out by the linear frame portions 73L and 73R and the protruded frame portions 90L and 90R corresponding thereto. Therefore, it is possible to effectively clear out the obstacle and it is thus possible to more reliably protect the rear wheels 3L and 3R.

Further, in the present preferred embodiment, the left protruded frame portion 90L protrudes outward at the same or substantially the same height as that of the linear left frame portion 73L. Similarly, the right protruded frame portion 90R protrudes outward at the same or substantially the same height as that of the linear right frame portion 73R. Thus, it is possible to effectively clear out the obstacle outside of the vehicle 1 by the linear frame portions 73L and 73R and the protruded frame portions 90L and 90R having the same or substantially the same height as those of the frame portions 73L and 73R.

Further, in the present preferred embodiment, in a front view, the left frame portion 73L is positioned within a range of a width, in the left-right direction, of the left front wheel 2L and within a range of a width, in the left-right direction, of the left rear wheel 3L. Further, in a front view, the right frame portion 73R is positioned within a range of a width, in the left-right direction, of the right front wheel 2R and within a range of a width, in the left-right direction, of the right rear wheel 3R. Thus, the left frame portion 73L and the right frame portion 73R are provided with a small width, in the left-right direction, of the vehicle 1. As a result, by such frame portions 73L and 73R having a small width in the left-right direction, and the protruded frame portions 90L and 90R corresponding thereto, the obstacle is guided to outside of the vehicle 1 to be cleared out forward of the rear wheels 3L and 3R. It is thus possible to effectively clear out the obstacle to more reliably protect the rear wheels 3L and 3R.

Further, in the present preferred embodiment, the left protruded frame portion 90L includes the rear end edge 97L extending in the left-right direction to face a front side of the left rear wheel 3L, and the right protruded frame portion 90R includes the rear end edge 97R extending in the left-right direction to face a front side of the right rear wheel 3R. Thus, it is possible to arrange the rear end edge 97L of the left protruded frame portion 90L close to the left rear wheel 3L. Similarly, it is possible to arrange the rear end edge 97R of the right protruded frame portion 90R close to the right rear wheel 3R. As a result, it is possible to more reliably clear out the obstacle appearing at the front of the rear wheel 3R by the corresponding protruded frame portions 90L and 90R.

In addition, the left protruded frame portion 90L and the right protruded frame portion 90R each include the tapered portion 92a expanding outward toward the rear side. The provision of the tapered portion 92a guides the obstacle to outside of the vehicle 1 and the obstacle is effectively cleared out from forward of the rear wheels 3L and 3R. As a result, it is possible to more reliably protect the rear wheels 3L and 3R.

The left frame portion 73L, the right frame portion 73R, the left protruded frame portion 90L, and the right protruded frame portion 90R are made from a metal, and thus, it is possible to reliably clear out the obstacle from forward of the rear wheels 3L and 3R.

Further, the protruded frame portions 90L and 90R and the frame portions 73L and 73R are preferably rigidly coupled by welding, and thus, it is possible to reliably clear out the obstacle from forward of the rear wheels 3L and 3R.

Further, as understood from FIG. 8, FIG. 9, FIG. 15A, FIG. 15B, etc., in a front view, the outermost end 151L of the left protruded frame portion 90L is positioned preferably within the left end region 160L of a width, for example, about 30% (more preferably about 20%) of the entire width, in the left-right direction, of the left rear wheel 3L. Similarly, in a front view, the outermost end 151R of the right protruded frame portion 90R preferably is positioned within the right end region 160R of a width, for example, about 30% (more preferably about 20%) of the entire width, in the left-right direction, of the right rear wheel 3R. Therefore, in a front view, a region of a width, in a left-right direction, preferably covering, for example, about 70% or more (more preferably about 80% or more) from inside of the rear wheels 3L and 3R is protected by the frame 4. As a result, it is possible to reliably protect the rear wheels 3L and 3R.

Further, in the present preferred embodiment, the left protruded frame portion 90L is positioned at a height within a width, in the up-down direction, of the left rear wheel 3L. Similarly, the right protruded frame portion 90R is positioned at a height within a width, in the up-down direction, of the right rear wheel 3R. Therefore, it is possible to more reliably protect the corresponding rear wheels 3L and 3R by the protruded frame portions 90L and 90R.

Further, in the present preferred embodiment, the left protruded frame portion 90L is positioned outside of the left rear wheel fender 57L, and the right protruded frame portion 90R is positioned outside of the right rear wheel fender 57R. More specifically, the outermost end 151L of the left protruded frame portion 90L is positioned outside of the outermost end 152L of the left rear wheel fender 57L. In other words, a left end of the left protruded frame portion 90L is positioned at a left side with respect to a left end of the left rear wheel fender 57L. Similarly, the outermost end 151R of the right protruded frame portion 90R is positioned outside of the outermost end 152R of the right rear wheel fender 57R. In other words, a right end of the right protruded frame portion 90R is positioned at a right side with respect to a right end of the right rear wheel fender 57R. Therefore, the left protruded frame portion 90L and the right protruded frame portion 90R bulge sufficiently outward, and thus, the protruded frame portions 90L and 90R effectively clear out the obstacle from forward of the rear wheels 3L and 3R to protect the rear wheels 3L and 3R from damage.

Further, in the present preferred embodiment, a length DL, in the front-back direction, between the left rear wheel 3L and the outermost end 151L of the left protruded frame portion 90L is shorter than the width WL, in the left-right direction, of the left rear wheel 3L. Similarly, a length DR, in the front-back direction, between the right rear wheel 3R and the outermost end 151R of the right protruded frame portion 90R is shorter than the width WR, in the left-right direction, of the right rear wheel 3R. Thus, the left protruded frame portion 90L is arranged at a position sufficiently close to the left rear wheel 3L, at a front side of the left rear wheel 3L. Similarly, the right protruded frame portion 90R is arranged at a position sufficiently close to the right rear wheel 3R, at a front side of the right rear wheel 3R. Therefore, immediately before each of the left rear wheel 3L and the right rear wheel 3R, the left protruded frame portion 90L and the right protruded frame portion 90R clear out the obstacle. As a result, it is possible to reliably prevent damage to the left rear wheel 3L and the right rear wheel 3R.

Preferred embodiments of the present invention have been described above. However, as described below, the present invention may be implemented in other modes.

The left protruded frame portion 90L may be arranged forward of the rear end of the left frame portion 73L. Similarly, the right protruded frame portion 90R may be arranged forward of the rear end of the right frame portion 73R. However, it is preferable that the left protruded frame portion 90L and the right protruded frame portion 90R are arranged at symmetrical positions, that is, at an equal front-back direction position.

The left protruded frame portion 90L and the right protruded frame portion 90R do not necessarily need to have the same structure. Further, the protruded frame portions 90L and 90R may not necessarily be manufactured by processing a metal plate. For example, a protruded frame portion made from a pipe-shaped frame may be used.

For fixing the protruded frame portions 90L and 90R to the frame portions 73L and 73R, a structure other than welds may be used. For example, bolts may be used.

The rear end edges 97L and 97R of the protruded frame portions 90L and 90R may not necessarily need to extend along the left-right direction. That is, in a plan view, the rear end edges 97L and 97R may be inclined rearward and inward. Further, in a front view, the rear end edges 97L and 97R may be inclined to elevate or descend toward an inner side.

The protruded frame portions 90L and 90R may not necessarily include the tapered portion 92a. For example, in a plan view, the protruded frame portions 90L and 90R may have a rectangular shape or a substantially rectangular shape. Further, the protruded frame portions 90L and 90R may not necessarily include the side surface portion 92b parallel to the front-back direction. That is, for example, the entire guide portion 92 may be the tapered portion 92a. The shape of the tapered portion 92a of the protruded frame portions 90L and 90R may not necessarily be linear and may be a curved or a polygonal line.

In a plan view, the protruded frame portions 90L and 90R may not necessarily have a polygonal shape such as a trapezoidal shape, and, for example, the plan view shape thereof may have a partial circular shape or have a partial elliptical shape.

The left and right frame portions 73L and 73R may not necessarily strictly extend along the front-back direction of the vehicle 1, and may be arranged such that a distance between the left and right frame portions 73L and 73R expands or narrows toward a rear. The left and right frame portions 73L and 73R may not necessarily be arranged horizontally, and may be disposed to be inclined to elevate or descend toward a rear. The left and right frame portions 73L and 73R may not necessarily be linear, and may include a curved portion.

The vehicle 1 preferably includes the two seat units 5L and 5R arranged to the left and right. However, the vehicle according to the present invention may include three or more seat units arranged in the left-right direction, or may include only one seat unit. Further, the vehicle may include two or more seat rows spaced apart in the front-back direction.

The vehicle 1 preferably includes the front differential device 47 and the rear differential device 48. However, either one or both of the front differential device 47 and the rear differential device 48 may be omitted. Preferably, at least the front differential device 47 is provided. A differential lock mechanism to invalidate a function of either one or both of the front differential device 47 and the rear differential device 48 may be provided. The differential lock mechanism is useful for running on a road on which it is difficult to obtain traction such as a boggy area.

The vehicle 1 preferably includes the pair of front wheels 2L and 2R and the pair of rear wheels 3L and 3R. However, the vehicle may include two or more pairs of the front wheels and/or two or more pairs of the rear wheels.

The vehicle 1 preferably includes an internal combustion engine 31. However, a drive source of the vehicle 1 may include an electric motor.

The vehicle 1 preferably belongs to a category of recreational off road vehicles, for example. However, the vehicle according to the present invention may be other types of vehicles belonging to the category of utility vehicles. Examples of such a utility vehicle include a side-by-side vehicle. Generally, the utility vehicle includes a frame structure and a wheel suitable for running off-road.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A vehicle comprising:
   a left front wheel and a right front wheel arranged in a left-right direction of the vehicle;
   a left rear wheel and a right rear wheel arranged in the left-right direction of the vehicle, and rearward of the left front wheel and the right front wheel; and
   a frame configured to rotatably support the left front wheel, the right front wheel, the left rear wheel, and the right rear wheel; wherein
   the frame includes:
      a left frame portion and a right frame portion each extending in a front-back direction of the vehicle;
      a left protruded portion that is supported by the left frame portion, that protrudes to a left side with respect to the left frame portion, and that is arranged forward of the left rear wheel; and
      a right protruded portion that is supported by the right frame portion, that protrudes to a right side with respect to the right frame portion, and that is arranged forward of the right rear wheel;
   the left rear wheel, the left protruded portion, and the left front wheel are arranged in this order from outside to inside in a front view of the vehicle; and
   the right rear wheel, the right protruded portion, and the right front wheel are arranged in this order from outside to inside in the front view of the vehicle.

2. The vehicle according to claim 1, wherein the left protruded portion is provided at a rear end of the left frame portion, and the right protruded portion is provided at a rear end of the right frame portion.

3. The vehicle according to claim 1, wherein an outermost end of the left rear wheel, an outermost end of the left protruded portion, and an outermost end of the left front wheel are arranged in this order from outside to inside in the front view of the vehicle; and
   an outermost end of the right rear wheel, an outermost end of the right protruded portion, and an outermost end of the right front wheel are arranged in this order from outside to inside in the front view of the vehicle.

4. The vehicle according to claim 1, wherein the left frame portion extends linearly in the front-back direction between the left front wheel and the left rear wheel, and the left protruded portion protrudes in a direction to cross a longitudinal direction of the left frame portion; and
   the right frame portion extends linearly in the front-back direction between the right front wheel and the right rear wheel, and the right protruded portion protrudes in a direction to cross a longitudinal direction of the right frame portion.

5. The vehicle according to claim 1, wherein, in the front view, the left frame portion is positioned within a range of a width, in the left-right direction, of the left front wheel and within a range of a width, in the left-right direction, of the left rear wheel; and
   in the front view, the right frame portion is positioned within a range of a width, in the left-right direction, of the right front wheel and within a range of a width, in the left-right direction, of the right rear wheel.

6. The vehicle according to claim 1, wherein the left protruded portion includes a rear end edge extending in the left-right direction to face a front side of the left rear wheel; and
   the right protruded portion includes a rear end edge extending in the left-right direction to face a front side of the right rear wheel.

7. The vehicle according to claim 1, wherein the left protruded portion and the right protruded portion each include a tapered portion tapered outward toward a rear of the vehicle.

8. The vehicle according to claim 1, wherein the left frame portion, the right frame portion, the left protruded portion, and the right protruded portion are made from metal.

9. The vehicle according to claim 8, wherein the left protruded portion is welded to the left frame portion, and the right protruded portion is welded to the right frame portion.

10. The vehicle according to claim 1, wherein, in the front view, an outermost end of the left protruded portion is positioned within a left end region having a width about 30% of an entire width, in the left-right direction, of the left rear wheel; and
    in the front view, an outermost end of the right protruded portion is positioned within a right end region having a width about 30% of an entire width, in the left-right direction, of the right rear wheel.

11. The vehicle according to claim 1, wherein the left protruded portion is disposed at a height within a width, in an up-down direction of the vehicle, of the left rear wheel; and
    the right protruded portion is disposed at a height within a width, in the up-down direction of the vehicle, of the right rear wheel.

12. A vehicle comprising:
    a left front wheel and a right front wheel arranged in a left-right direction of the vehicle;
    a left rear wheel and a right rear wheel arranged in the left-right of the direction of the vehicle, and rearward of the left front wheel and the right front wheel; and
    a frame configured to rotatably support the left front wheel, the right front wheel, the left rear wheel, and the right rear wheel;
    a left rear wheel fender that is supported by the frame and covers at least a portion of the left rear wheel; and
    a right rear wheel fender that is supported by the frame and covers at least a portion of the right rear wheel; wherein
    the frame includes:
       a left frame portion and a right frame portion each extending in a front-back direction of the vehicle;
       a left protruded portion that is supported by the left frame portion, that protrudes to a left side with respect to the left frame portion, and that is arranged forward of the left rear wheel; and
       a right protruded portion that is supported by the right frame portion, that protrudes to a right side with respect to the right frame portion, and that is arranged forward of the right rear wheel;
    the left rear wheel, the left protruded portion, and the left rear wheel fender are arranged in this order from outside to inside in a plan view of the vehicle; and the right rear wheel, the right protruded portion, and the right rear wheel fender are arranged in this order from outside to inside in the plan view of the vehicle.

13. The vehicle according to claim 12, wherein the left protruded portion is provided at a rear end of the left frame portion, and the right protruded portion is provided at a rear end of the right frame portion.

14. The vehicle according to claim 12, wherein an outermost end of the left rear wheel, an outermost end of the left protruded portion, and an outermost end of the left rear wheel fender are arranged in this order from outside to inside in the plan view of the vehicle; and
an outermost end of the right rear wheel, an outermost end of the right protruded portion, and an outermost end of the right rear wheel fender are arranged in this order from outside to inside in the plan view of the vehicle.

15. The vehicle according to claim 12, wherein an outermost end of the left protruded portion is positioned at a left side with respect to an outermost end of the left rear wheel fender; and
an outermost end of the right protruded portion is positioned at a right side with respect to an outermost end of the right rear wheel fender.

16. The vehicle according to claim 12, wherein, in a front view, the left frame portion is positioned within a range of a width, in the left-right direction, of the left front wheel and within a range of a width, in the left-right direction, of the left rear wheel; and
in the front view, the right frame portion is positioned within a range of a width, in the left-right direction, of the right front wheel and within a range of a width, in the left-right direction, of the right rear wheel.

17. The vehicle according to claim 12, wherein the left protruded portion includes a rear end edge extending in the left-right direction to face a front side of the left rear wheel; and
the right protruded portion includes a rear end edge extending in the left-right direction to face a front side of the right rear wheel.

18. The vehicle according to claim 12, wherein the left protruded portion and the right protruded portion each include a tapered portion tapered outward toward a rear.

19. The vehicle according to claim 12, wherein the left frame portion, the right frame portion, the left protruded portion, and the right protruded portion are made from metal;
the left protruded portion is welded to the left frame portion; and
the right protruded portion is welded to the right frame portion.

20. The vehicle according to claim 12, wherein, in a front view, an outermost end of the left protruded portion is positioned within a left end region having a width about 30% of an entire width, in the left-right direction, of the left rear wheel; and
in the front view, an outermost end of the right protruded portion is positioned within a right end region having a width about 30% of an entire width, in the left-right direction, of the right rear wheel.

21. A vehicle comprising:
a left front wheel and a right front wheel arranged in a left-right direction of the vehicle;
a left rear wheel and a right rear wheel arranged in a left-right direction of the vehicle, and rearward of the left front wheel and the right front wheel; and
a frame configured to rotatably support the left front wheel, the right front wheel, the left rear wheel, and the right rear wheel; wherein
the frame includes:
a left frame portion and a right frame portion each extending in a front-back direction of the vehicle;
a left protruded portion that is supported by the left frame portion, that protrudes to a left side with respect to the left frame portion, and that is arranged forward of the left rear wheel; and
a right protruded portion that is supported by the right frame portion, that protrudes to a right side with respect to the right frame portion, and that is arranged forward of the right rear wheel;
a length in the front-back direction between the left rear wheel and the outermost end of the left protruded portion is shorter than a width, in the left-right direction, of the left rear wheel;
a length in the front-back direction between the right rear wheel and the outermost end of the right protruded portion is shorter than a width, in the left-right direction, of the right rear wheel; and
an entire length of each of the left protruded portion and the right protruded portion in the front-back direction is substantially the same as or less than the width, in the left-right direction, of the left rear wheel and the right rear wheel, respectively.

22. The vehicle according to claim 21, wherein, in a front view, the left frame portion is positioned within a range of a width, in the left-right direction, of the left front wheel and within a range of a width, in the left-right direction, of the left rear wheel; and
in the front view, the right frame portion is positioned within a range of a width, in the left-right direction, of the right front wheel and within a range of a width, in the left-right direction, of the right rear wheel.

23. The vehicle according to claim 21, wherein the left protruded portion includes a rear end edge extending in the left-right direction to face a front side of the left rear wheel; and
the right protruded portion includes a rear end edge extending in the left-right direction to face a front side of the right rear wheel.

24. The vehicle according to claim 21, wherein the left protruded portion and the right protruded portion each include a tapered portion tapered outward toward a rear.

25. The vehicle according to claim 21, wherein the left frame portion, the right frame portion, the left protruded portion, and the right protruded portion are made from metal;
the left protruded portion is welded to the left frame portion; and
the right protruded portion is welded to the right frame portion.

26. The vehicle according to claim 21, wherein, in a front view, an outermost end of the left protruded portion is positioned within a left end region having a width about 30% of an entire width, in the left-right direction, of the left rear wheel; and
in the front view, an outermost end of the right protruded portion is positioned within a right end region having a width about 30% of an entire width, in the left-right direction, of the right rear wheel.

* * * * *